US012739501B2

(12) United States Patent
Umeda et al.

(10) Patent No.: US 12,739,501 B2

(45) Date of Patent: Sep. 15, 2026

(54) INFORMATION PROCESSING DEVICE AND INFORMATION PROCESSING METHOD

(71) Applicant: Sony Group Corporation, Tokyo (JP)

(72) Inventors: Tetsuo Umeda, Kanagawa (JP); Kohei Oka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 257 days.

(21) Appl. No.: 18/690,748

(22) PCT Filed: Mar. 14, 2022

(86) PCT No.: PCT/JP2022/011326

§ 371 (c)(1), (2) Date: Mar. 11, 2024

(87) PCT Pub. No.: WO2023/047648

PCT Pub. Date: Mar. 30, 2023

(65) Prior Publication Data

US 2025/0142206 A1 May 1, 2025

(30) Foreign Application Priority Data

Sep. 22, 2021 (JP) ................................ 2021-153870

(51) Int. Cl.

*H04N 23/66* (2023.01)
*B64G 1/66* (2006.01)

(Continued)

(52) U.S. Cl.

CPC ............... *H04N 23/66* (2023.01); *B64G 1/66* (2013.01); *H04N 7/183* (2013.01); (Continued)

(58) Field of Classification Search

None

See application file for complete search history.

(56) References Cited

U.S. PATENT DOCUMENTS

2014/0201667 A1* 7/2014 Schoeberl ........... G06F 3/04842 715/771

FOREIGN PATENT DOCUMENTS

JP H11-136661 A 5/1999
JP 2013-084072 A 5/2013

(Continued)

OTHER PUBLICATIONS

"SatTrack (V4.0)—A Real-time Satellite Tracking and Orbit Prediction Program"; Manfred Bester; IEEE Aerospace Applications Conference, Feb. 1996. (Year: 1996).*

(Continued)

*Primary Examiner* — David Ometz

(74) *Attorney, Agent, or Firm* — Paratus Law Group, PLLC

(57) ABSTRACT

There is provided an information processing device and an information processing method for providing an imaging service for performing imaging with a camera mounted on an artificial satellite. The information processing device includes a display control unit that causes a first screen to be displayed, the first screen including a map display unit that displays an artificial satellite that orbits around a celestial object and an orbit of the artificial satellite on a map of the celestial object, and a time information display unit that displays time information on the orbit of the artificial satellite. The display control unit causes the first screen to synchronously display the position of the artificial satellite on the map of the celestial object on the map display unit and the time information about the artificial satellite on the time information display unit. The technology according to the present disclosure can be applied to an information processing device or the like that provides an imaging service for performing imaging with a camera mounted on an artificial satellite, for example.

20 Claims, 17 Drawing Sheets

(51) Int. Cl.
*H04N 7/18* (2006.01)
*H04N 23/63* (2023.01)
*H04N 23/69* (2023.01)
*H04N 23/695* (2023.01)

(52) U.S. Cl.
CPC ......... *H04N 23/632* (2023.01); *H04N 23/633* (2023.01); *H04N 23/69* (2023.01); *H04N 23/695* (2023.01)

(56) References Cited

FOREIGN PATENT DOCUMENTS

| | | | |
|---|---|---|---|
| JP | 2013-145507 | A | 7/2013 |
| JP | 2015-028759 | A | 2/2015 |
| JP | 2020-173604 | A | 10/2020 |

OTHER PUBLICATIONS

"Simple Visualization Tool for Analysis of Satellite Orbits and Constellations"; Truchly et al; 2016 International Conference on Emerging eLearning Technologies and Applications (ICETA). (Year: 2016).*
"On-demand Command and Control of ASTERIA with Cloud-based Ground Station Services"; Hughes et al; 2021 IEEE Aerospace Conference, Mar. 6-13, 2021. (Year: 2021).*
"Feasible Area Determination tool for Earth Observation Satellite"; Nilnarong et al; COMNETSAT 2014. (Year: 2014).*
"Design of the Flight Dynamics Subsystem for the COMS Satellite Ground Control System"; Lee et al; 2007 3rd International Conference on Recent Advances in Space Technologies; 2007. (Year: 2007).*
"GOKTURK-2: Two Years of Operation"; Gurgenburan et al; 2015 7th International Conference on Recent Advances in Space Technologies (RAST); 2015. (Year: 2015).*
"Satellite Orbit Determination and Tracking Model Using Two-line Elements Set"; Abdelkarim et al; 2018 International Conference on Computer, Control, Electrical, and Electronics Engineering; 2018. (Year: 2018).*
"Satellite Orbit Determination and Power Subsystem Design"; Bekhti et al; IGARSS 2003; 2003 IEEE International Geoscience and Remote Sensing Symposium (IEEE Cat. No. 03CH37477); 2003. (Year: 2003).*

* cited by examiner

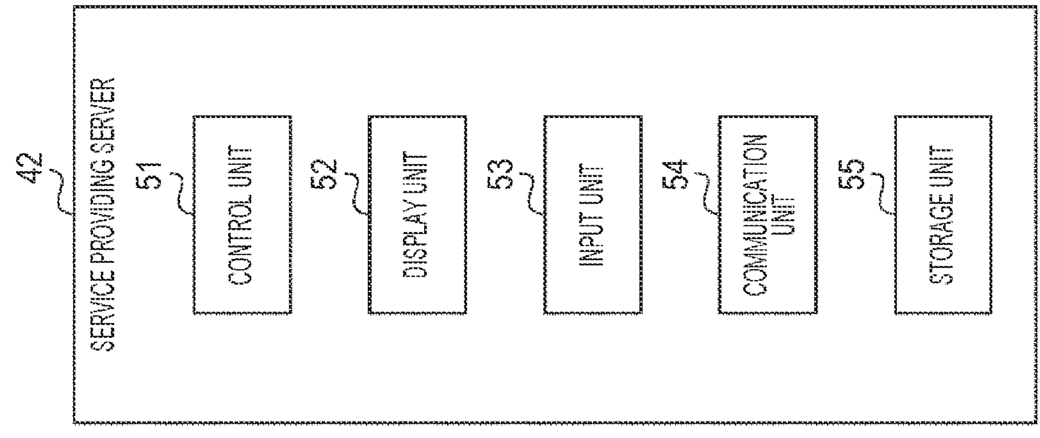
FIG. 2
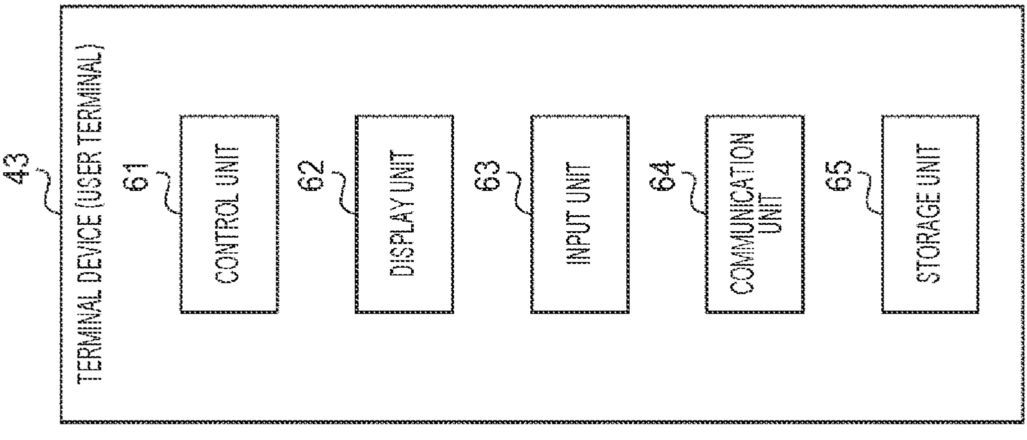

FIG. 3

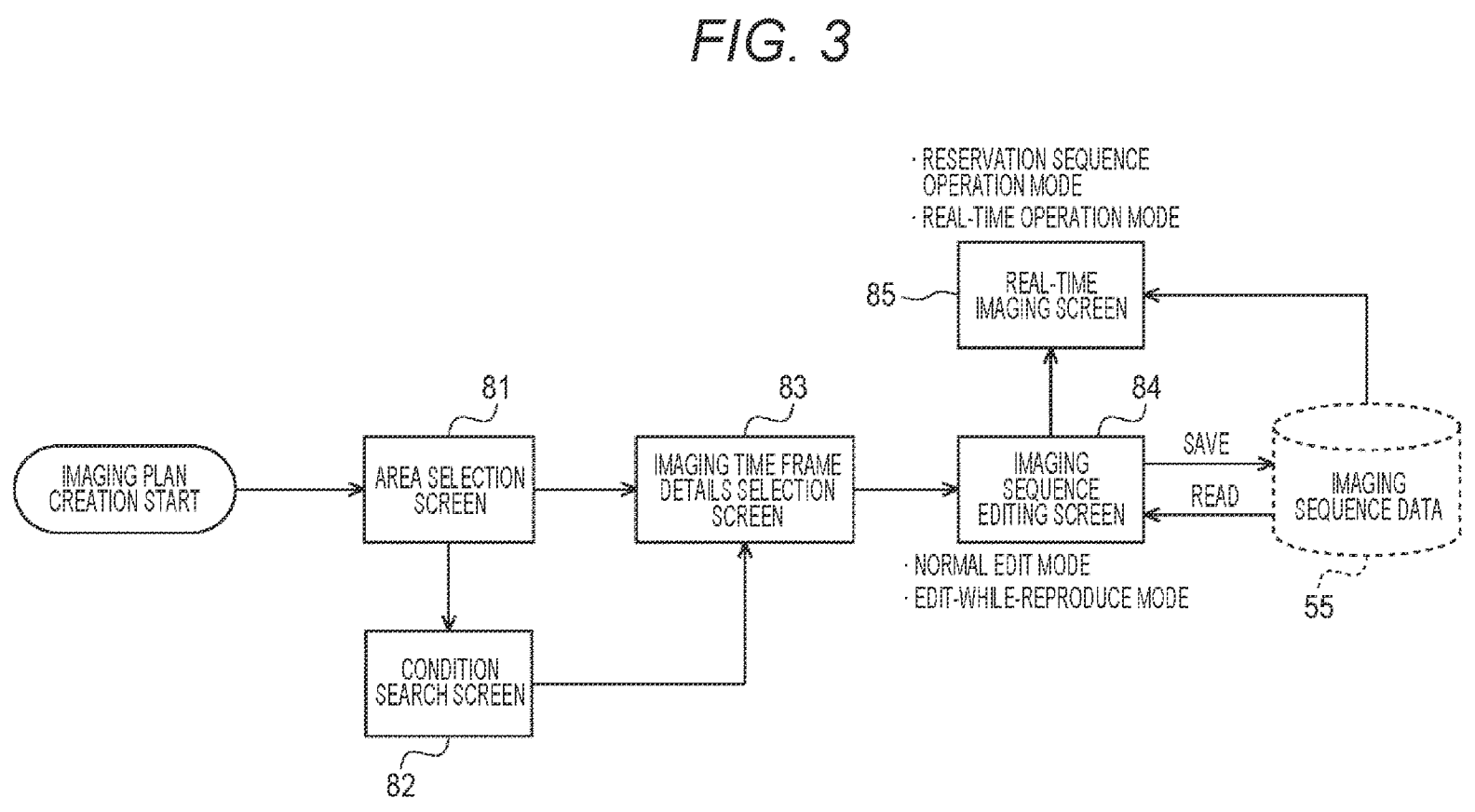

IMAGING PLAN CREATION START

AREA SELECTION SCREEN
81

CONDITION SEARCH SCREEN
82

IMAGING TIME FRAME DETAILS SELECTION SCREEN
83

IMAGING SEQUENCE EDITING SCREEN
84

· NORMAL EDIT MODE
· EDIT-WHILE-REPRODUCE MODE

REAL-TIME IMAGING SCREEN
85

· RESERVATION SEQUENCE OPERATION MODE
· REAL-TIME OPERATION MODE

SAVE

READ

IMAGING SEQUENCE DATA
55

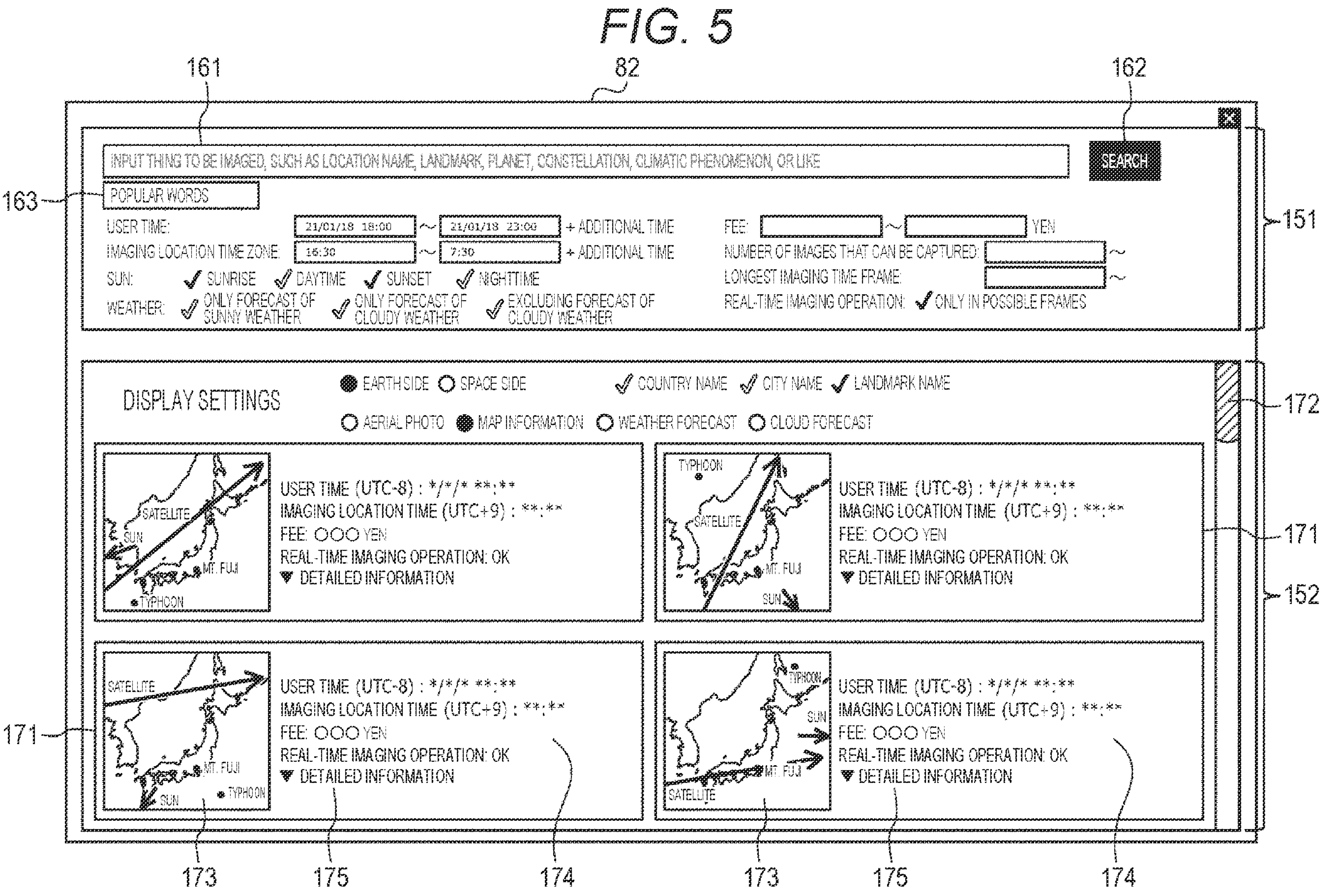
FIG. 5
82
161
162
163
151
152
171
172
173
174
175
INPUT THING TO BE IMAGED, SUCH AS LOCATION NAME, LANDMARK, PLANET, CONSTELLATION, CLIMATIC PHENOMENON, OR LIKE
SEARCH
POPULAR WORDS
USER TIME:
21/01/18 18:00
21/01/18 23:00
+ ADDITIONAL TIME
IMAGING LOCATION TIME ZONE:
16:30
7:30
+ ADDITIONAL TIME
SUN:
SUNRISE
DAYTIME
SUNSET
NIGHTTIME
WEATHER:
ONLY FORECAST OF SUNNY WEATHER
ONLY FORECAST OF CLOUDY WEATHER
EXCLUDING FORECAST OF CLOUDY WEATHER
FEE:
YEN
NUMBER OF IMAGES THAT CAN BE CAPTURED:
LONGEST IMAGING TIME FRAME:
REAL-TIME IMAGING OPERATION:
ONLY IN POSSIBLE FRAMES
DISPLAY SETTINGS
EARTH SIDE
SPACE SIDE
COUNTRY NAME
CITY NAME
LANDMARK NAME
AERIAL PHOTO
MAP INFORMATION
WEATHER FORECAST
CLOUD FORECAST
SATELLITE
SUN
TYPHOON
MT. FUJI
USER TIME (UTC-8) : */*/* :
IMAGING LOCATION TIME (UTC+9) : :
FEE: OOO YEN
REAL-TIME IMAGING OPERATION: OK
▼ DETAILED INFORMATION

FIG. 6

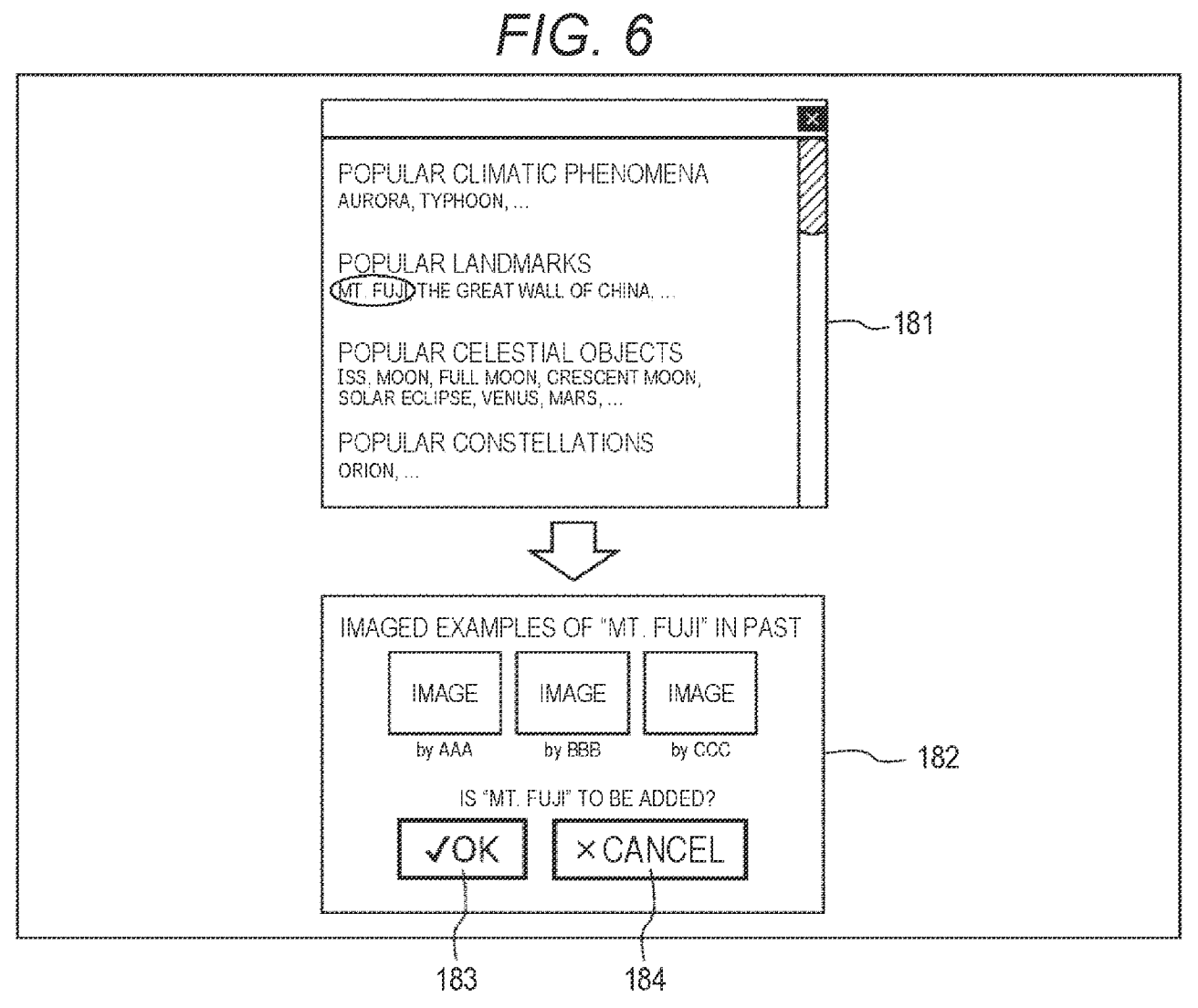

POPULAR CLIMATIC PHENOMENA
AURORA, TYPHOON, ...
POPULAR LANDMARKS
MT. FUJI THE GREAT WALL OF CHINA, ...
POPULAR CELESTIAL OBJECTS
ISS, MOON, FULL MOON, CRESCENT MOON,
SOLAR ECLIPSE, VENUS, MARS, ...
POPULAR CONSTELLATIONS
ORION, ...
181

IMAGED EXAMPLES OF "MT. FUJI" IN PAST
IMAGE
by AAA
IMAGE
by BBB
IMAGE
by CCC
IS "MT. FUJI" TO BE ADDED?
✓OK
×CANCEL
182
183
184

FIG. 8

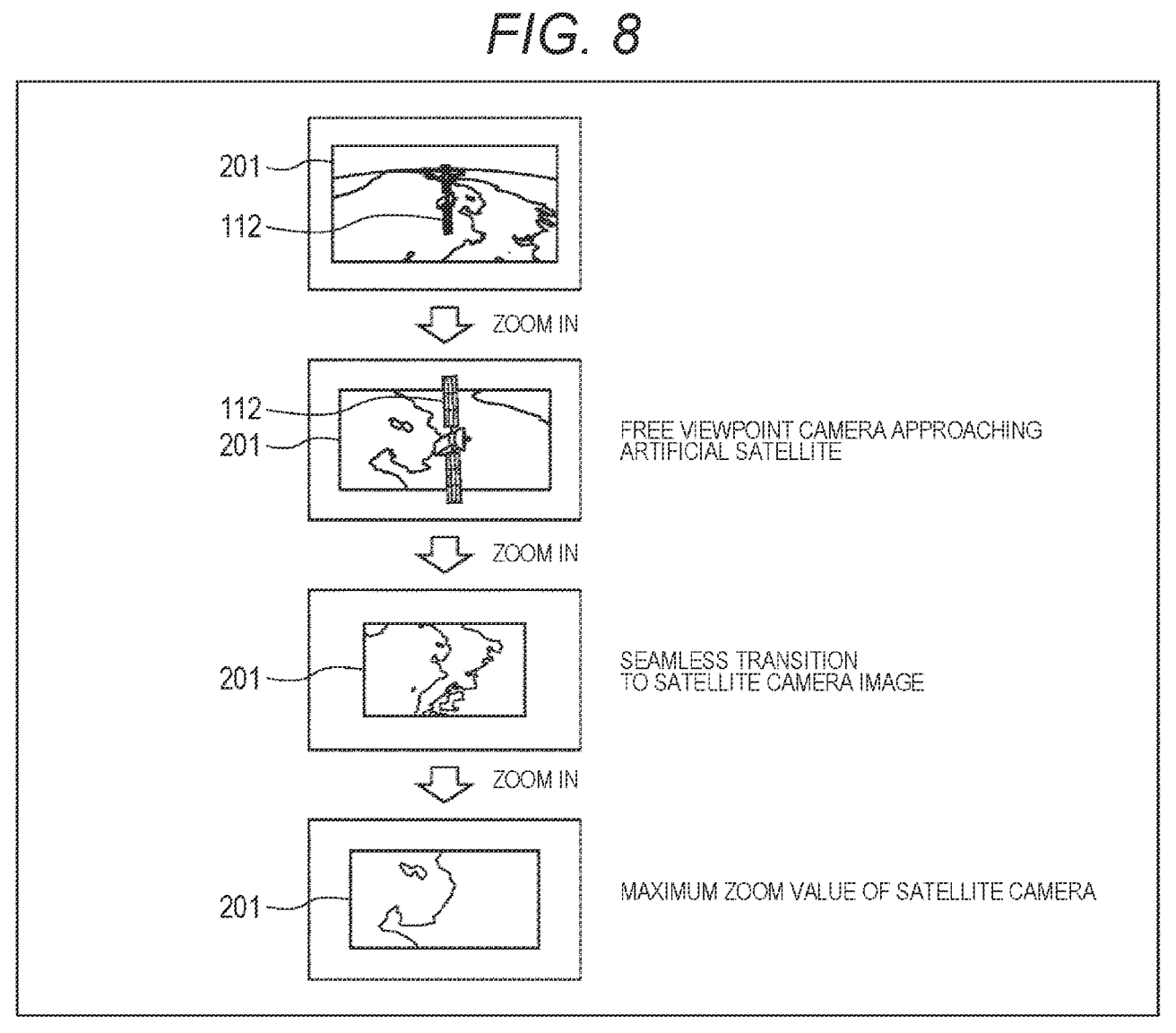

201
112
ZOOM IN
FREE VIEWPOINT CAMERA APPROACHING ARTIFICIAL SATELLITE
112
201
ZOOM IN
SEAMLESS TRANSITION TO SATELLITE CAMERA IMAGE
201
ZOOM IN
MAXIMUM ZOOM VALUE OF SATELLITE CAMERA
201

84
401
402
END EDIT
AERIAL PHOTO
SPOT
REMAINING PIECES:12
REAL-TIME IMAGING IS ABOUT TO START!
3 MINUTES AND 24 SECONDS TO GO
TO REAL-TIME IMAGING SCREEN
IMAGING
ZOOMING
PANNING
TILTING
ROLLING
10:35
10:35:28.7
10:36
RETURN 85
441
442
443
444
445
446
447
448
451
452
453
454
DIRECT OPERATION IS PERFORMED (TRANSITION TO REAL-TIME OPERATION MODE)
IMAGING
ZOOMING
PANNING
TILTING
ROLLING
MOVING IMAGE
STILL
STILL 85
441
442
447
451
452
453
454
461
462
443
444
445
448
449
281
282
283
284
285
332
333
HOLD RESERVATION SEQUENCE
RESET ALL REAL-TIME CORRECTING OPERATIONS (OPERATION WILL TRANSITION TO RESERVATION SEQUENCE OPERATION)
RESERVATION SEQUENCE HOLDING "ON"
SETTING
NOMINAL ATTITUDE
SCREEN CENTER AUTOMATIC TRACKING
AUTOMATIC TRACKING POINT SELECTION
IMAGING
ZOOMING
PANNING
TILTING
ROLLING

FIG. 18

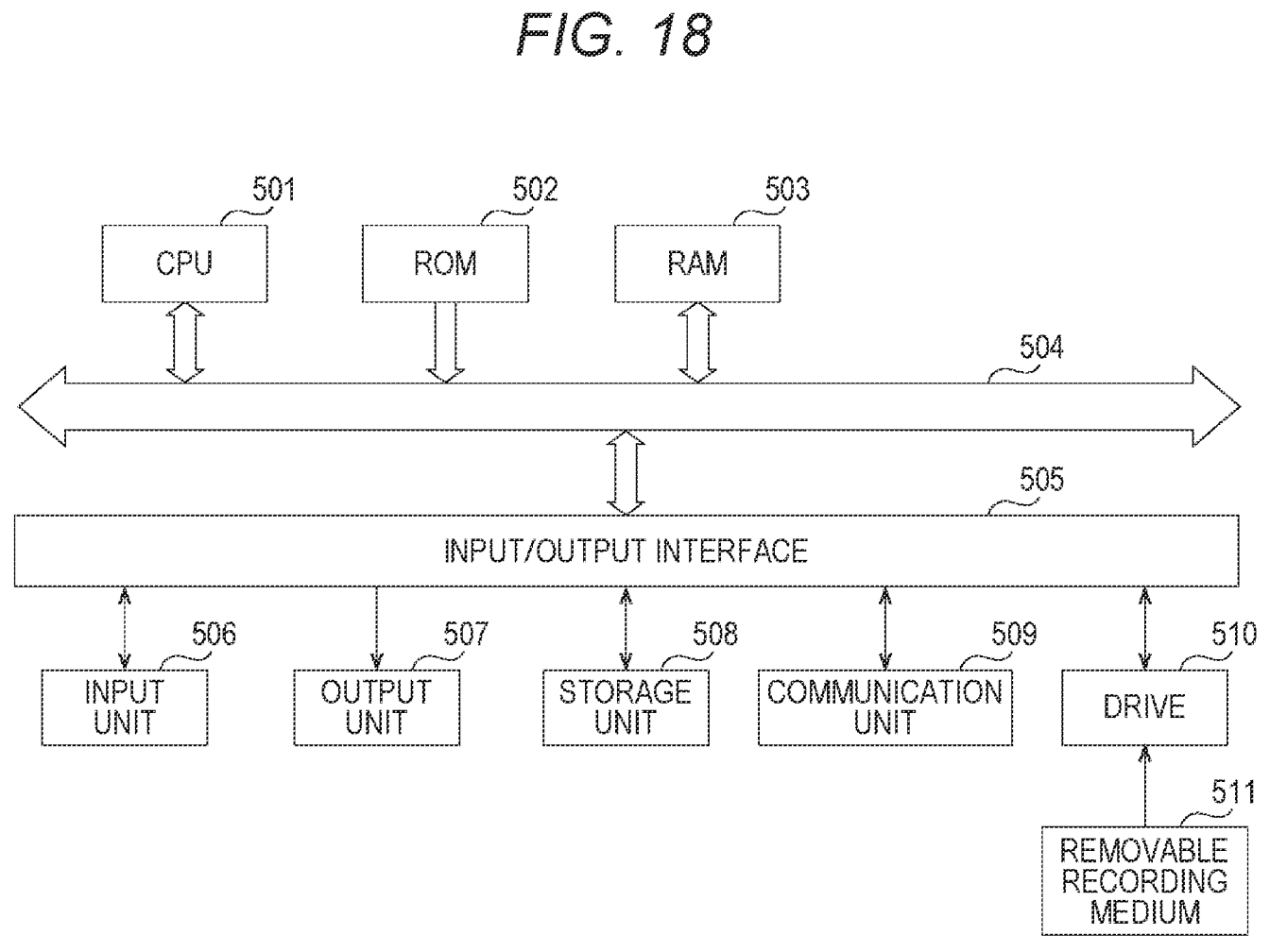

501 CPU
502 ROM
503 RAM
504
505 INPUT/OUTPUT INTERFACE
506 INPUT UNIT
507 OUTPUT UNIT
508 STORAGE UNIT
509 COMMUNICATION UNIT
510 DRIVE
511 REMOVABLE RECORDING MEDIUM

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2022/011326 (filed on Mar. 14, 2022) under 35 U.S.C. § 371, which claims priority to Japanese Patent Application No. 2021-153870 (filed on Sep. 22, 2021), which are all hereby incorporated by reference in their entirety.

TECHNICAL FIELD

The present disclosure relates to an information processing device and an information processing method, and more particularly, to an information processing device and an information processing method for providing an imaging service for performing imaging with a camera mounted on an artificial satellite.

BACKGROUND ART

There has been widespread use of remote sensing for observing a status of crops, a status of the ocean, and the like on the basis of an image result, by capturing an image of a predetermined point on the ground with a camera mounted on an artificial satellite that orbits in the sky above the earth in a low orbit or a medium orbit (see Patent Documents 1 and 2, for example).

CITATION LIST

Patent Document

Patent Document 1: Japanese Patent Application Laid-Open No. 2013-145507

Patent Document 2: Japanese Patent Application Laid-Open No. 2013-84072

SUMMARY OF THE INVENTION

Problems to be Solved by the Invention

In the future, services for enabling ordinary individuals and companies to easily perform imaging with cameras mounted on artificial satellites are expected to be provided.

The present disclosure has been made in view of such circumstances, and aims to provide an imaging service for performing imaging with a camera mounted on an artificial satellite.

Solutions to Problems

An information processing device according to one aspect of the present disclosure includes a display control unit that causes a first screen to be displayed, the first screen including a map display unit and a time information display unit, the map display unit displaying an artificial satellite that orbits a celestial object and the orbit of the artificial satellite on a map of the celestial object, the time information display unit displaying time information on the orbit of the artificial satellite. In the information processing device, the display control unit causes the first screen to synchronously display a position of the artificial satellite on the map of the celestial object on the map display unit, and time information about the artificial satellite on the time information display unit.

An information processing method according to one aspect of the present disclosure is implemented by an information processing device, the information processing method including causing a first screen to be displayed, the first screen including a map display unit and a time information display unit, the map display unit displaying an artificial satellite that orbits a celestial object and the orbit of the artificial satellite on a map of the celestial object, the time information display unit displaying time information on the orbit of the artificial satellite. The position of the artificial satellite on the map of the celestial object on the map display unit, and time information about the artificial satellite on the time information display unit are synchronously displayed on the first screen.

According to one aspect of the present disclosure, a first screen including a map display unit and a time information display unit is displayed, the map display unit displaying an artificial satellite that orbits a celestial object and the orbit of the artificial satellite on a map of the celestial object, the time information display unit displaying time information on the orbit of the artificial satellite. The position of the artificial satellite on the map of the celestial object on the map display unit, and time information about the artificial satellite on the time information display unit are synchronously displayed on the first screen.

Note that the information processing device according to one aspect of the present disclosure can be formed with a computer that is made to execute a program. Meanwhile, the program to be executed by the computer for forming the information processing device according to one aspect of the present disclosure can be transmitted via a transmission medium or be recorded on a recording medium to be provided.

The information processing device may be an independent device or may be an internal block which forms one device.

BRIEF DESCRIPTION OF DRAWINGS

FIG. 2 is a block diagram illustrating an example configuration of a service providing server and a user terminal shown in FIG. 1.

FIG. 3 is a diagram for explaining transition of a screen displayed on the user terminal by a service operation application.

FIG. 5 is a diagram illustrating an example screen of a condition search screen.

FIG. 6 is a diagram illustrating an example of the screen at a time when a popular word button is pressed.

FIG. 8 is a diagram illustrating an image on a camera image display unit when a zoom bar is operated.

FIG. 18 is a block diagram illustrating an example configuration of the hardware of a computer to which the technology according to the present disclosure is applied.

MODE FOR CARRYING OUT THE INVENTION

Figure 1:
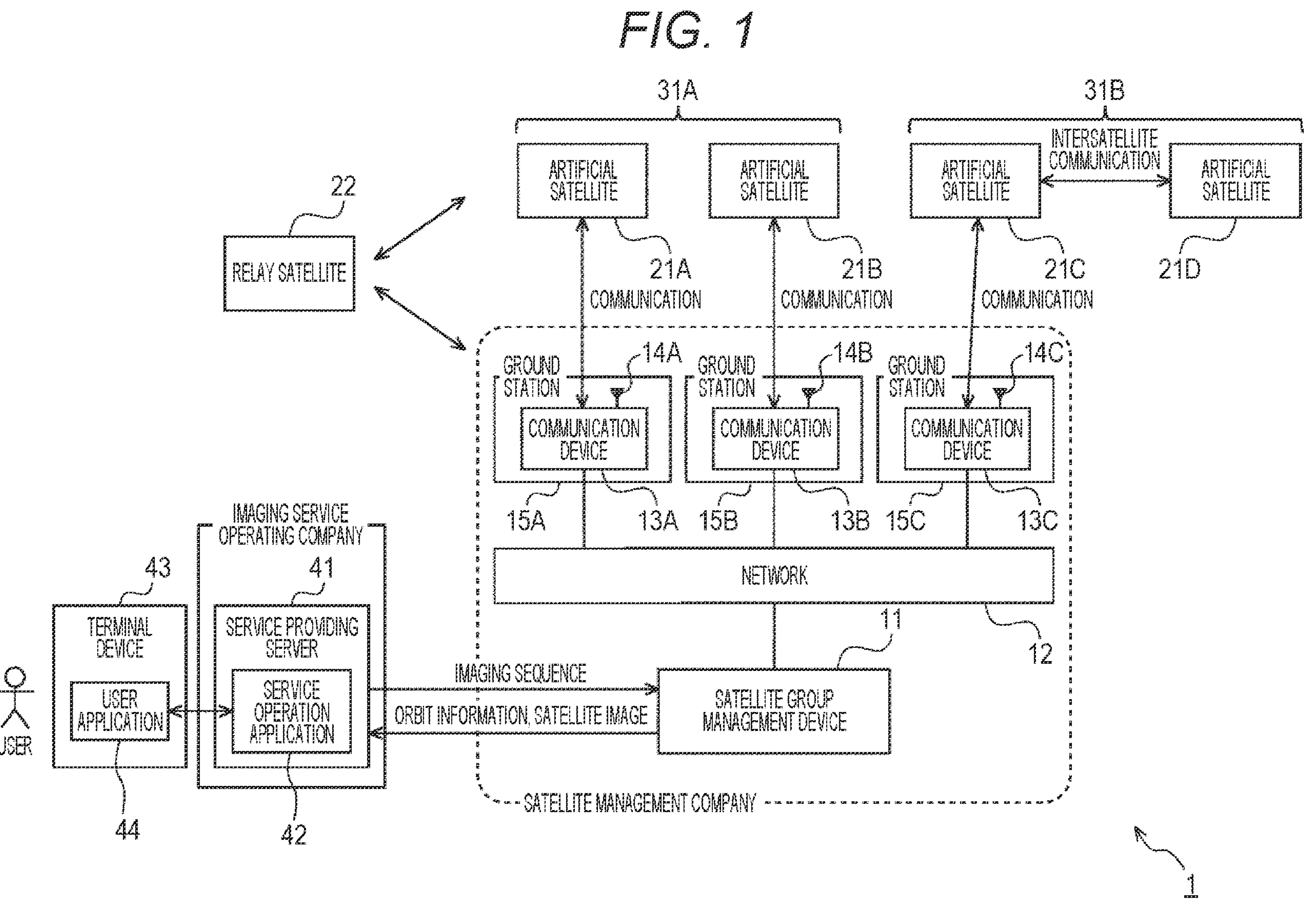
FIG. 1 is a block diagram illustrating an example configuration of a satellite image processing system to which the technology according to the present disclosure is applied.

The following is a description of a mode for carrying out the technology according to the present disclosure (the mode will be hereinafter referred to as an (the) embodiment), with reference to the accompanying drawings. Note that, in the present specification and the drawings, components having substantially the same functional configurations are denoted by the same reference signs, and explanation of them is not repeated. Explanation will be made in the following order.

1. Example configuration of a satellite image processing system
2. Example configurations of a service providing server and a user terminal
3. Screen transition of an imaging plan
4. Area selection screen
5. Condition search screen
6. Imaging time frame details selection screen
7. Imaging sequence editing screen
8. Real-time imaging screen
9. Flow of an imaging plan creation process
10. Example of a computer configuration <1. Example Configuration of a Satellite Image Processing System>

FIG. 1 is a block diagram illustrating an example configuration of a satellite image processing system according to an embodiment of the present disclosure.

A satellite image processing system 1 in FIG. 1 is a system that provides a satellite imaging service enabling an individual to perform imaging with a camera mounted on an artificial satellite 21 (hereinafter referred to simply as the satellite 21) that orbits the earth. In the present embodiment, the satellite 21 is equipped with a camera (an imaging sensor), and has at least a function of capturing an image of the ground or space. In the description below, there are cases where imaging by the camera mounted on the satellite 21 is explained as imaging by the satellite 21, for convenience.

The satellite image processing system 1 includes a satellite group management device 11 that is managed by a satellite management company, a service providing server (a server device) 41 that is managed by a satellite imaging service operating company, and a terminal device (hereinafter also referred to as the user terminal) 43 that is managed by a user who is a user of the satellite imaging service. The user terminal 43 can be formed with a personal computer, a smartphone, a tablet terminal, a personal digital assistant (PDA), a stationary game machine, a portable game machine, or the like, for example.

The satellite imaging service operating company provides the user with the satellite imaging service, using a service operation application 42 that is a software program to be executed on the service providing server 41.

The user uses the satellite imaging service by accessing the service operation application 42 via a predetermined network, from a user application 44 that is a software program executed on the user terminal 43. Via the user application 44, the user creates an imaging plan with a camera mounted on the satellite 21 (this camera will be hereinafter referred to as the satellite camera as appropriate), checks the real-time video image during the imaging, and acquires a satellite image obtained by the imaging. The satellite image may be a still image, or may be a moving image. Further, in a case where real-time communication with the satellite 21 is possible, the user can also perform a satellite camera operation such as zooming, panning, or tilting, for example, while performing real-time imaging.

The service operation application 42 acquires orbit information about the satellite 21 from the satellite group management device 11, and causes the user application 44 to display a predicted orbit of the satellite 21, a time zone in which imaging can be performed, and the like. The orbit information about the satellite 21 acquired from the satellite group management device 11 includes information such as a predicted orbit of the satellite 21, a time zone in which the satellite imaging service is unavailable, and the like. A predicted orbit of the satellite 21 is an orbit of the satellite 21 scheduled (planned) after the current time.

The service operation application 42 manages imaging frames of the satellite 21. The service operation application 42 generates an imaging sequence according to the imaging plan created by the user via the user application 44 of the user terminal 43, and transmits the imaging sequence to the satellite group management device 11. An imaging sequence is a series of data in which the imaging times and the imaging conditions on the predicted orbit of the satellite 21 are collected in time series. The imaging conditions include an orientation (zooming, panning, tilting, or rolling) and an angle of view (resolution) of the satellite camera, camera setting values (such as an imaging mode, an exposure value (EV), a shutter speed (SS), an aperture value (F-number), and an ISO sensitivity), and the like.

The service operation application 42 acquires, from the satellite group management device 11, the satellite image as a result of execution according to the imaging sequence, and provides the user with the satellite image. The service operation application 42 may provide the user with the (unprocessed) satellite image captured by the satellite 21, or may provide the user with the satellite image after adding predetermined information to the satellite image or performing predetermined image processing such as data processing and editing on the satellite image.

The service operation application 42 can perform image processing as described below, for example, on the satellite image captured by the satellite 21.

(1) Generation of Metadata

Metadata can be generated on the basis of information transmitted from the satellite 21 or information about the satellite 21 that has performed the imaging. For example, information about the latitude and longitude of an imaging target position, information about attitude control and acceleration at the time of imaging by the satellite 21, and the like can be generated as metadata. Note that metadata may be generated by the satellite 21 on the basis of the conditions at the time of imaging or the like, and, in that case, metadata added beforehand to a satellite image captured by the satellite 21 may be used.

(2) Process of Correcting a Satellite Image

It is possible to perform a correction process, such as radiometric correction regarding sensitivity characteristics, geometric correction of an orbital position, an attitude error, and the like of the satellite 21, ortho-correction for correcting geometric distortion caused by a height difference of terrain, and map projection for performing image projection onto a map projection surface.

(3) Color Synthesis Process

It is possible to perform a color synthesis process, such as a panning-sharpening process, a true-color synthesis process, a false color synthesis process, a natural color synthesis process, a SAR image synthesis process, and a process of adding a color to a satellite image in each band.

(4) Other Image Synthesis

It is also possible to perform synthesis with a satellite image captured in the past by the same satellite 21, a satellite image captured by another satellite 21, or some other image, synthesis between satellite images captured in different bands, synthesis with map information, and the like.

(5) Information Extraction

It is possible to calculate vegetation detection information such as a normalized difference vegetation index (NDVI) and water detection information such as a normalized difference water index (NDWI), with different bands such as red (R) and infrared (IR). It is possible to perform highlight processing of a specific subject such as a vehicle, a mobile object, or a fish group, extraction of information about a specific band or a change point from the previous imaging, and the like.

Further, in a case where a plurality of satellite images captured by a plurality of satellites 21 that perform constellation or formation flight described later is used, the service operation application 42 may perform image processing as described below.

(1) Resolution Enhancement or Quality Enhancement Process

By superimposing a plurality of satellite images, it is possible to generate a satellite image with enhanced resolution. Further, it is possible to generate a panned and sharpened image obtained by combining a monochrome image and a color image, and a high-resolution satellite image by synthesizing satellite images with different imaging conditions such as different dynamic ranges or shutter speeds, different bands (wavelength bands), or different resolutions, for example.

(2) Function Sharing

An index such as a normalized difference vegetation index (NDVI) can be calculated with different bands such as red (R) and infrared (IR).

(3) Three-Dimensional Measurement

Three-dimensional information can be obtained from a parallax image. Further, accuracy of object recognition on the ground can be enhanced with the three-dimensional information. For example, it is possible to determine whether or not an object is a vehicle (even if it is not immediately recognized as a vehicle from the image in terms of resolving power, it can be estimated as a vehicle when the object on the road is not a pattern but is recognized as a three-dimensional object).

(4) Difference Measurement

A change between a first time and a second time can be extracted with the use of a plurality of satellite images captured from the same position at different times. Also, imaging may be performed so that only a changed target is extracted and colored. Further, for example, a moving speed of a ship or a vehicle can be calculated with the use of a plurality of satellite images, or a wind speed can be calculated from movement of a cloud or the like.

(5) Other Image Synthesis

It is also possible to perform synthesis with a satellite image in the past or a satellite image captured by another satellite 21, synthesis of satellite images captured in different bands, synthesis with map information, and the like.

The user can check or acquire a satellite image via the user application 44. The user may be an individual, or may be (an employee of) a company that uses satellite images.

The satellite management company includes the satellite group management device 11 that manages a plurality of satellites 21, and a plurality of communication devices 13 that communicate with the satellites 21. Note that the satellite group management device 11 and some of the plurality of communication devices 13 may be devices owned by an organization other than the satellite management company. The satellite group management device 11 and the plurality of communication devices 13 are connected via a predetermined network 12. The communication devices 13 are disposed at ground stations (base stations on the ground) 15. Note that FIG. 1 illustrates an example in which the number of communication devices 13 is three, which are communication devices 13A to 13C, but any number of communication devices 13 may be adopted.

The satellite group management device 11 manages the plurality of satellites 21 owned by the satellite management company. Specifically, the satellite group management device 11 determines an operation plan for the plurality of satellites 21 that the satellite group management device 11 owns. The satellite group management device 11 then gives an imaging instruction to a predetermined satellite 21 via the communication device 13 according to the imaging sequence transmitted from the service operation application 42 of the service providing server 41, and thus, causes the predetermined satellite 21 to perform imaging. The satellite group management device 11 also acquires and stores a satellite image transmitted from the satellite 21 via the communication device 13. The acquired satellite image is provided (transmitted) to the service operation application 42. Alternatively, the acquired satellite image may be provided to the service operation application 42 after predetermined image processing is performed in the satellite group management device 11.

The communication device 13 communicates with the predetermined satellite 21 designated by the satellite group management device 11 via an antenna 14, under the control of the satellite group management device 11. For example, the communication device 13 transmits, to the predetermined satellite 21, an imaging instruction for performing imaging of a predetermined region on the ground at a predetermined time and position. The communication device 13 also receives the satellite image transmitted from the satellite 21, and supplies the satellite image to the satellite group management device 11 via the network 12. Transmission from the communication device 13 of the ground station 15 to the satellite 21 is also referred to as uplink transmission, and transmission from the satellite 21 to the communication device 13 is also referred to as downlink transmission. The communication device 13 can perform direct communication with the satellite 21, and can also perform communication via a relay satellite 22. As the relay satellite 22, a geostationary satellite is used, for example.

The network 12, the network between the user terminal 43 and the service providing server 41, and the network between the service providing server 41 and the satellite group management device 11 are any communication networks, and may be wired communication networks or wireless communication networks, or may include both a wired communication network and a wireless communication network. Further, the network 12, and the network among the user terminal 43, the service providing server 41, and the satellite group management device 11 may be formed with one communication network, or may be formed with a plurality of communication networks. These networks may be a communication network or a communication path compliant with any appropriate communication standard, such as the Internet, a public telephone network, a wide-area communication network for a wireless mobile object such as a so-called 4G line or 5G line, a wide area network (WAN), a local area network (LAN), a wireless communication network that performs communication compliant with the Bluetooth (registered trademark) standard, a communication path for short-range wireless communication such as near field communication (NFC), a communication path for infrared communication, or a communication network of wired communication compliant with a standard such as high-definition multimedia interface (HDMI (registered trademark)) or universal serial bus (USB), for example.

A plurality of satellites 21 may constitute a satellite group 31, and may be operated as a constellation system or a formation flight system. A constellation system is a system in which a large number of satellites 21 are provided to a single orbital plane or a plurality of orbital planes, to uniformly provide services mainly around the entire sphere. Even a single satellite has a predetermined function, and a plurality of satellites 21 is operated to enhance an observation frequency and the like. On the other hand, a formation flight system is a system in which a plurality of satellites 21 is deployed in a narrow area of about several kilometers while maintaining a relative positional relationship. In the formation flight system, it is possible to provide services that cannot be realized by a single satellite, such as highly accurate three-dimensional measurement and speed detection for a mobile object. In a case where a plurality of satellites 21 is operated by a constellation system or a formation flight system, a satellite 21A and a satellite 21B constitute a first satellite group 31A, and a satellite 21C and a satellite 21D constitute a second satellite group 31B, for example. Note that, in this example, for the sake of simplicity, one satellite group 31 is formed with two satellites 21, but the number of satellites 21 constituting one satellite group 31 is not limited to two.

In a case where a communication device 13 communicates with each of the satellites 21 constituting a satellite group 31, there are a method of individually communicating with each satellite 21 as in the first satellite group 31A in FIG. 1, and a method in which, as in the second satellite group 31B, only one satellite 21C representing a satellite group 31 (the satellite 21C will be hereinafter also referred to as the representative satellite 21C) communicates with the communication device 13 while the other satellite 21D communicates indirectly with the communication device 13 through intersatellite communication with the representative satellite 21C. Which method is to be used for communicating with (the communication device 13 of) a ground station 15 may be determined beforehand by the satellite group 31, or may be appropriately selected in accordance with the contents of communication.

<2. Example Configurations of the Service Providing Server and the User Terminal>

FIG. 2 is a block diagram illustrating an example configuration of the service providing server 41 and the user terminal 43.

The service providing server 41 includes at least a control unit 51, a display unit 52, an input unit 53, a communication unit 54, and a storage unit 55.

The control unit 51 controls operations of the entire service providing server 41, and executes the service operation application 42 stored in the storage unit 55. As described above, the service operation application 42 executed on the control unit 51 receives a user operation performed on the user application 44, generates an imaging plan in accordance with a designation made by the user, transmits a user operation command in real-time imaging to the satellite group management device 11, acquires a satellite image that is a result of the imaging execution from the satellite group management device 11, and the like.

The display unit 52 is formed with an LCD or an organic EL display, for example, and displays a screen for the service operation application 42 or displays an imaging sequence, a satellite image, or the like generated in response to a user operation.

The input unit 53 includes a keyboard, a mouse, a touch panel, or the like, for example, receives an operation from a satellite imaging service operator (an employee of the satellite imaging service operating company), and supplies the input operation and data to the control unit 51. The satellite imaging service operator can change (update) the service operation application 42 on the service providing server 41.

The communication unit 54 performs predetermined communication with the satellite group management device 11, the user terminal 43, and the like, under the control of the control unit 51. For example, the communication unit 54 transmits an imaging sequence created by the service operation application 42, to the satellite group management device 11. Also, for example, the communication unit 54 receives a satellite image from the satellite group management device 11, and stores the satellite image into the storage unit 55.

The storage unit 55 stores predetermined data such as the service operation application 42, the imaging sequence created by the service operation application 42, and the satellite image received from satellite group management device 11.

The terminal device (user terminal) 43 includes at least a control unit 61, a display unit 62, an input unit 63, a communication unit 54, and a storage unit 65.

The control unit 61 controls operations of the entire terminal device 43, and executes the user application 44 stored in the storage unit 65. In a case where the service providing server 41 is a WEB server, for example, the user application 44 executed on the control unit 61 is browser software capable of exchanging predetermined information with the WEB server. The user application 44 may be a software program created exclusively for satellite imaging services. The user application 44 executed on the control unit 61 transmits a user operation and data input by the input unit 63 to the service operation application 42, and thus, enables generation of an imaging plan by the user. The user application 44 also acquires a satellite image that is a result of imaging from service operation application 42, and stores the satellite image into the storage unit 65.

The display unit 62 is formed with an LCD or an organic EL display, for example, and displays a screen for the user application 44.

The input unit 63 is formed with a keyboard, a mouse, a touch panel, a game controller, or the like, for example, receives a user operation, and supplies the user operation to the control unit 61.

The communication unit 64 performs predetermined communication with the service providing server 41 and the like, under the control of the control unit 61. For example, the communication unit 64 transmits data input on the user application 44 to the service providing server 41, and receives a satellite image transmitted from the service providing server 41.

The storage unit 65 stores predetermined data such as login information about the user to the service operation application 42 and a satellite image received from the service providing server 41.

<3. Screen Transition of an Imaging Plan>

Next, a screen to be displayed on the user application 44 of the user terminal 43 under the control of the service operation application 42 in a case where the user creates an imaging plan is described with reference to FIG. 3.

FIG. 3 is a diagram for explaining transition of a screen to be displayed in a case where the user creates an imaging plan.

When the user accesses the service operation application 42 via the user application 44, and performs an operation to start creation of an imaging plan, an area selection screen 81 is first displayed. On the area selection screen 81, the user determines a general location and time for imaging. On the area selection screen 81, the predicted orbit of the satellite 21 can be checked over the entire earth. The area selection screen 81 will be described later in detail, with reference to FIG. 4. When a general location and time for imaging are determined (designated), the display screen transitions from the area selection screen 81 to an imaging time frame details selection screen 83.

The area selection screen 81 has a search function of searching for an appropriate imaging time in accordance with the object (a landmark or the like) to be imaged and the conditions. When the search function is executed on the area selection screen 81, a condition search screen 82 is displayed. The condition search screen 82 will be described later in detail, with reference to FIGS. 5 and 6. When the user selects a predetermined imaging time from among the imaging times displayed as a search result on the condition search screen 82, the display screen transitions from the condition search screen 82 to the imaging time frame details selection screen 83.

On the imaging time frame details selection screen 83, the user can determine in which imaging time frame imaging is to be performed, while checking how an image will be viewed from the satellite 21. The imaging time frame can be set on minute basis. The imaging time frame details selection screen 83 will be described later in detail, with reference to FIGS. 7 and 8. When the imaging time frame is determined, the display screen transitions from the imaging time frame details selection screen 83 to an imaging sequence editing screen 84.

On the imaging sequence editing screen 84, the user determines specific imaging conditions, such as how to actually cause the satellite 21 to perform imaging within the determined imaging time frame. For example, the start and the end of each operation of zooming (enlargement or reduction), panning (movement in a lateral direction), tilting (movement in a vertical direction), and rolling (rotation about the axis of the satellite 21) of the satellite camera, the timing of capturing a still image or a moving image, and the like can be designated on the timeline.

The imaging sequence creation to be performed on the imaging sequence editing screen 84 includes imaging sequence creation in a "normal edit mode" and imaging sequence creation in an "edit-while-reproduce mode". In the "normal edit mode", an imaging preview moving image that is an image to be actually captured by the satellite camera is checked as needed, and each operation such as panning, tilting, rolling, or zooming of the satellite camera is designated. The "edit-while-reproduce mode" is a mode in which each operation such as panning, tilting, rolling, or zooming performed by the user while reproducing the imaging preview moving image is recorded without any change as an imaging condition in the imaging sequence, and is a mode suitable for editing a moving image sequence.

The imaging sequence editing screen 84 has operability similar to that of video editing software. The imaging sequence editing screen 84 will be described later in detail, with reference to FIGS. 9 to 13.

The imaging sequence created on the imaging sequence editing screen 84 is stored as imaging sequence data into the storage unit 55. The imaging sequence data stored in the storage unit 55 is transmitted from the service providing server 41 to the satellite group management device 11 at predetermined timing. The imaging sequence data stored in the storage unit 55 can also be read and changed (edited).

When the imaging time in the imaging sequence created in advance (this imaging sequence will be hereinafter also referred to as the reservation sequence) comes, a real-time imaging screen 85 is displayed. In a case where the imaging time in the reservation sequence comes during creation of an imaging sequence on the imaging sequence editing screen 84, the display screen can transition from the imaging sequence editing screen 84 to the real-time imaging screen 85.

On the real-time imaging screen 85, the user can check, in real time, the satellite image (video image) being actually captured by the satellite 21. The real-time imaging screen 85 has a "reservation sequence operation mode" and a "real-time operation mode". In the "reservation sequence operation mode", the satellite 21 is controlled in accordance with the imaging sequence created in advance, and the satellite image being actually captured by the satellite 21 is displayed in real time. The "real-time operation mode" is a mode in which control according to the imaging sequence created in advance is canceled, and the user operates the satellite 21 in real time to perform imaging. It is also possible to return from the "real-time operation mode" to the "reservation sequence operation mode". The real-time imaging screen 85 will be described later in detail, with reference to FIGS. 14 to 16.

In the "reservation sequence operation mode" of the real-time imaging screen 85, the satellite group management device 11 transmits a satellite control command as to an imaging instruction, panning, tilting, zooming, or the like to the satellite 21 via the communication device 13, in accordance with the reservation sequence created in advance. In the "real-time operation mode", a user operation command as to an imaging instruction, panning, tilting, zooming, or the like is transmitted from the service providing server 41 of the service operation application 42 to the satellite group management device 11 in real time, and a satellite control command corresponding to the user operation command is transmitted from the satellite group management device 11 to the satellite 21 via the communication device 13.

In the description below, the screens from the area selection screen 81 to the real-time imaging screen 85, and user operations are sequentially explained in detail.

<4. Area Selection Screen>

Figure 4:
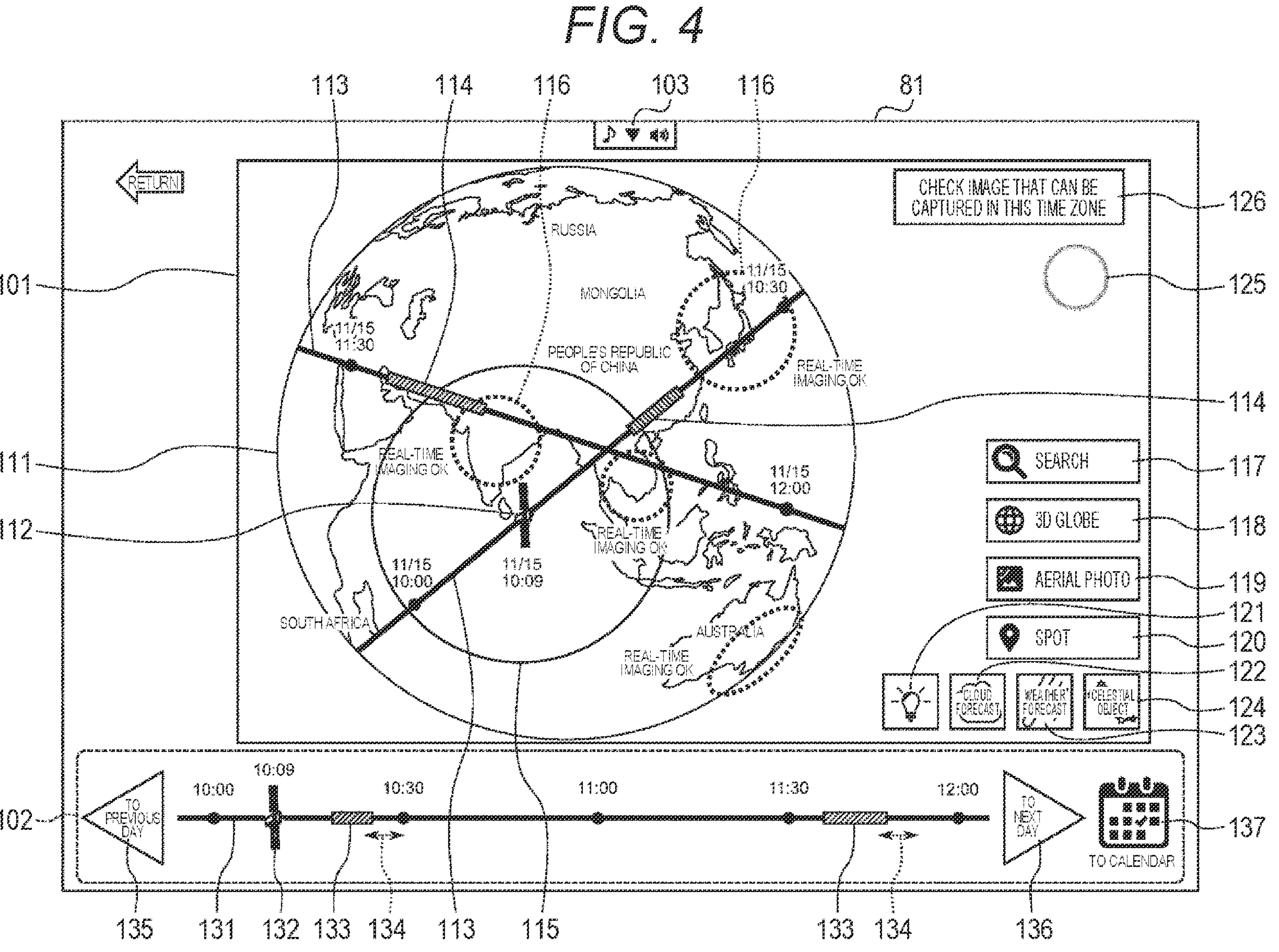
FIG. 4 is a diagram illustrating an example screen of an area selection screen.

FIG. 4 illustrates an example screen of the area selection screen 81. This area selection screen 81 is displayed when an "imaging plan creation" button is pressed on the start screen displayed on the user application 44, for example.

The area selection screen 81 includes a globe display unit 101 as a map display unit that displays a world map, and a time slider display unit 102.

A globe 111 is displayed on the globe display unit 101. The world map on the globe 111 is rotated, enlarged, and reduced in accordance with a user's operation such as a mouse operation or a keyboard operation, with the center of the earth being fixed, as in Google Earth (trademark), for example.

The satellite 112 corresponding to a predetermined satellite of a plurality of satellites 21, and its predicted orbit 113 are displayed on the globe 111. Unreservable time zones 114 are displayed in part of the displayed predicted orbit 113. The unreservable time zones 114 are expressed by a color, a pattern, or the like different from that of the predicted orbit 113, and indicate time zones in which imaging cannot be reserved due to maintenance of the satellite 112 (satellite 21), an already reserved imaging sequence, or the like. At predetermined points on the predicted orbit 113, the dates and times at which the satellite 112 will pass are displayed.

The image that includes the globe 111, the satellite 112, the predicted orbit 113, and the like, and is displayed on the globe display unit 101 corresponds to an image obtained by performing imaging from a camera of an overhead view virtually disposed at a desired position away from the satellite 112 (this camera will be hereinafter referred to as a free viewpoint camera). Rotating, enlarging, or reducing the display of the globe 111 with the center fixed at the center of the earth by a user operation such as a mouse operation or a keyboard operation corresponds to moving the free viewpoint camera to a desired position or changing the angle of view (the imaging range) of the free viewpoint camera.

On the globe 111, a satellite imaging range 115 indicating a range that can be imaged by the satellite 112 is also displayed in a circular shape around the position of the satellite 112. In other words, the satellite imaging range 115 corresponds to the horizon when viewed from the satellite 112.

Further, on the globe 111, real-time imaging ranges 116 each indicating an area in which real-time communication and real-time imaging can be performed are displayed. A plurality of real-time imaging ranges 116 exists on the ground, because of the relationship between the predicted orbit 113 of the satellite 112 and (the communication devices 13 of) the ground stations 15 installed on the ground. When the satellite 112 is located on the predicted orbit 113 in the dashed circle centered on a ground station 15, real-time imaging becomes possible.

The globe display unit 101 includes a search button 117, a 3D globe switching button 118, an aerial photo switching button 119, a spot display switching button 120, a day/night presentation switching button 121, a cloud forecast switching button 122, a weather forecast switching button 123, and a celestial object switching button 124.

The search button 117 is pressed when a condition search for searching for a time at which imaging is possible is performed by specifying time, day or night, coordinates, a landmark, a location name, and the like as search conditions. When the search button 117 is pressed, the condition search screen 82 illustrated in FIG. 5 is displayed.

The 3D globe switching button 118 is pressed when the world map display is switched between a 3D globe and a two-dimensional map. The globe 111 in the example in FIG. 4 corresponds to a 3D globe, and the characters on the 3D globe switching button 118 are "3D globe" indicating the current 3D globe display.

The aerial photo switching button 119 is pressed when the world map display is switched between an aerial photograph and map information. The globe 111 in the example in FIG. 4 corresponds to an aerial photograph, and the characters on the aerial photo switching button 119 are "aerial photo" indicating the current aerial photo display.

The spot display switching button 120 is pressed when whether or not to display a principal imaging target on the world map on the globe 111 is switched. In a case where imaging target display is on, and a principal imaging target is displayed on the world map, the display (characters) of the imaging target is clicked, and a suggestion list of time zones in which imaging is readily performed is popped up.

The day/night presentation switching button 121 is pressed when the day/night presentation is turned on or off. In a case where the day/night presentation switching button 121 is on, the day or night is presented on the globe 111. The cloud forecast switching button 122 is pressed when the display for checking the cloud forecast is turned on or off. In a case where the cloud forecast switching button 122 is on, clouds based on the forecast are displayed on the globe 111. The weather forecast switching button 123 is pressed when the display for checking the weather forecast is turned on or off.

In a case where the weather forecast switching button 123 is on, weather based on the forecast is displayed on the globe 111. The celestial object switching button 124 is pressed when the display for checking celestial objects including constellations is turned on or off. In a case where the celestial object switching button 124 is on, the globe 111 becomes semitransparent and turns into a view in which celestial objects such as constellations can be easily checked, and celestial objects such as constellations are displayed on the globe 111.

On the globe display unit 101, the positions of celestial objects such as the sun, the moon, and constellations at a designated time can also be checked. For example, in a case where the sun is present at a designated time, the sun 125 is displayed.

A details selection screen transition button 126 is displayed at the upper right of the globe display unit 101. The details selection screen transition button 126 is pressed in a case where the screen is to shift to the imaging time frame details selection screen 83. "Check the image that can be captured in this time zone" is displayed on the details selection screen transition button 126. When the user presses the details selection screen transition button 126, the longest imaging time frame that can be set around the imaging time of the position of the satellite 112 at the time of the pressing is selected as the imaging time frame. The longest imaging time frame that can be secured by the user in one imaging plan is determined beforehand by limitations such as the battery capacity of the satellite 21 (20 minutes, for example). Here, the imaging time frame to be set is a time width that is within a range not exceeding the greatest value of the image imaging time frame determined beforehand, and can be secured except for the unreservable time zones.

The time slider display unit 102 displays a time slider 131 as time information on the predicted orbit 113 of the satellite 112. On the time slider 131, a satellite 132 is displayed, and this satellite 132 corresponds to the satellite 112 on the globe display unit 101. The time slider 131 also displays unreservable time zones 133 corresponding to the unreservable time zones 114 on the globe display unit 101. Further, in predetermined time zones on the time slider 131, real-time imaging enabled time zones 134 corresponding to the real-time imaging ranges 116 on the globe display unit 101 are also displayed. The real-time imaging enabled time zones 134 are represented by section with arrows, and indicate time zones in which real-time imaging is possible.

A “to previous day” button 135 and a “to next day” button 136 are disposed at both ends of the time slider 131. When the user presses the “to previous day” button 135, it is possible to move the time slider 131 in the direction to go back in time, and, when the user presses the “to next day” button 136, it is possible to move the time slider 131 in the direction to go ahead in time. A calendar button 137 is pressed when the user wants to designate a date different from the current date. When the calendar button 137 is pressed, a calendar from which a date can be selected is displayed.

A BGM reproduction unit 103 is disposed at the center of the uppermost portion of the area selection screen 81. The BGM reproduction unit 103 is designed to enable the user to select a tune and control the volume of the tune as background music (BGM). The user can create an imaging sequence while listening to the BGM.

Operations to be performed by the user on the area selection screen 81 are now described.

The user searches for a location to be imaged while rotating, enlarging, or reducing the display of the globe 111 on the globe display unit 101 by a mouse operation, a keyboard operation, or the like, and clicks one point on the predicted orbit 113 passing near the location to be imaged. When one point on the predicted orbit 113 is clicked, the satellite 112 moves to the clicked point. By dragging the satellite 112 on the predicted orbit 113, it is also possible to move the position of the satellite 112 to any desired position on the predicted orbit 113. The display of the dates and times on the predicted orbit 113, and the display of the satellite imaging range 115 and the real-time imaging ranges 116 are also changed with the position of the satellite 112. In a case where the day/night presentation switching button 121, the cloud forecast switching button 122, the weather forecast switching button 123, or the celestial object switching button 124 is on, the globe 111 displays the day/night, the cloud forecast, the weather forecast, and celestial objects (such as the sun 125) in accordance with the time corresponding to the position of the satellite 112 on the predicted orbit 113.

The time on the time slider 131 of the time slider display unit 102 is changed with the position of the satellite 112 on the predicted orbit 113 moved by the user. The position of the satellite 132 on the time slider 131, the unreservable time zones 133, and the real-time imaging enabled time zones 134 are also changed with the position of the satellite 112 on the globe display unit 101.

As described above, on the area selection screen 81, when the satellite 112 on the predicted orbit 113 on the globe display unit 101 is moved by clicking or dragging, the display of the time slider 131, the satellite 132, and the like on the time slider display unit 102 is synchronously changed. Conversely, the display of the globe display unit 101 is also changed in synchronization with a changing operation performed on the time slider display unit 102. That is, when the user moves the satellite 132 on the time slider 131 by clicking a predetermined point on the time slider 131 or dragging the satellite 132 on the time slider 131, the world map on the globe 111, the predicted orbit 113, the position of the satellite 112, and the like on the globe display unit 101 are changed with the position of the moved satellite 132. The display of the satellite imaging range 115 and the real-time imaging ranges 116 is also changed with the position of the moved satellite 112. As the service operation application 42 synchronously displays the position of the satellite 112 on the globe display unit 101 and the time information about the satellite 132 on the time slider display unit 102 on the user application 44 displayed on the screen of the user terminal 43 in this manner, it is possible to determine the imaging location and the imaging time frame while intuitively grasping the imaging locations and the capturing time frames on the earth and in space.

In a case where the user has moved the satellite 112 on the predicted orbit 113 to a point where imaging is to be performed, and determined a general location and time for imaging, the user presses the details selection screen transition button 126. When the details selection screen transition button 126 is pressed, a predetermined time width around the satellites 112 and 133 is determined as the imaging time frame, and the screen display is changed from the area selection screen 81 to the imaging time frame details selection screen 83.

On the area selection screen 81, the user can determine the location for imaging (a position on the predicted orbit 113) and the time for imaging (an imaging time), while checking the predicted orbit 113, the unreservable time zones 114, the satellite imaging range 115, and the real-time imaging ranges 116 of the satellite 112 (corresponding to the satellite 21). It is possible to determine the location and time for imaging, while checking the celestial objects, the day or night, the cloud forecast, the rain forecast, and the like in accordance with the position (time) of the satellite 112 on the predicted orbit 113.

In a case where the user does not wish to search for a desired point on the world map on the globe 111 but wishes to search for an imaging time that meets a predetermined condition, the user presses the search button 117. When the search button 117 is pressed, the condition search screen 82 in FIG. 5 is displayed.

<5. Condition Search Screen>

FIG. 5 illustrates an example screen of the condition search screen 82.

The condition search screen 82 includes a condition setting unit 151 and a search result display unit 152.

The user can input a condition to be searched for to the condition setting unit 151. To a keyword input portion 161, a keyword related to the object to be imaged, such as a location name, a landmark, a planet, a constellation, and a climatic phenomenon, is input. After inputting a keyword to the keyword input portion 161, the user presses a search button 162, so that a search result is displayed on the search result display unit 152.

As for search conditions, in addition to inputting and designating a desired keyword to the keyword input portion 161, a condition such as “user time”, “imaging location time zone”, “sun”, “weather”, “fee”, “number of images that can be captured”, “longest imaging time frame”, or “real-time imaging operation” can also be designated.

The “user time” can be designated with the time at the user location. The “imaging location time zone” can be designated with the time at the imaging location. As for the “sun”, one or more of “sunrise”, “daytime”, “sunset”, or “nighttime” can be designated. As for the “weather”, one or more of “only forecast of sunny weather”, “only forecast of cloudy weather”, or “excluding forecast of cloudy weather” can be designated. As for the “fee”, a designation can be made with the fee required for imaging. As for the “number of images that can be captured", the number of images that can be captured can be designated. In the "longest imaging time frame", it is possible to designate the longest imaging time. In the "real-time imaging operation", it is possible to designate whether or not to search only for an imaging location (trajectory) where real-time imaging is possible.

When a popular word button 163 displayed below the keyword input portion 161 is pressed, a popular word list screen 181 shown in FIG. 6 is displayed. On the popular word list screen 181, a list of words popular as search words is displayed. When the user designates (clicks) one of the words displayed on the popular word list screen 181, an imaged example screen 182 showing examples (imaged examples) of satellite images captured in the past with the designated word is displayed.

The imaged example screen 182 in FIG. 6 shows an example in which the word "Mount Fuji" has been designated from among a plurality of words displayed on the popular word list screen 181.

On the imaged example screen 182, when an OK button 183 is pressed, the popular word list screen 181 and the imaged example screen 182 are erased, and the display screen returns to the condition search screen 82. The result of the search with the word designated on the popular word list screen 181 is displayed on the search result display unit 152.

On the other hand, when a cancel button 184 is pressed on the imaged example screen 182, the imaged example screen 182 is erased, and the display screen returns to the popular word list screen 181.

The search result display unit 152 on the condition search screen 82 in FIG. 5 shows an example of the search result to be obtained in a case where the OK button 183 is pressed on the imaged example screen 182 in FIG. 6 displaying the past imaged examples of "Mount Fuji", or in a case where "Mount Fuji" is input as the keyword to the keyword input portion 161, and the search button 162 is pressed.

The search result display unit 152 displays candidate imaging locations 171 that satisfy the designated condition ("Mount Fuji" in this example). In a case where the number of candidate imaging locations 171 is too large to be displayed on one screen, a scroll bar 172 is displayed, and the candidate imaging locations 171 in the search result display unit 152 can be scrolled.

Each candidate imaging location 171 displays an imaging location map 173, imaging location principal information 174, and imaging location detailed information 175. The imaging location map 173 displays the predicted orbit of the satellite 21, the direction of the sun, and the position of the imaging target input to the search word. By checking the imaging location map 173, the user can check the predicted orbit of the satellite 21, the direction of the sun, the position of the imaging target input to the search word, and the like.

The imaging location principal information 174 displays information including the "user time", the "imaging location time zone", the "fee", and the "real-time imaging operation" at the candidate imaging location 171. When the imaging location detailed information 175 is designated (clicked) by the user, it is possible to check the shortest distance between the imaging target input to the search word and the predicted orbit of the satellite 21, imaged examples under a similar imaging condition in the past, and the like.

When the user designates (clicks) a desired candidate imaging location 171 from among the one or more candidate imaging locations 171 displayed on the search result display unit 152, the longest possible imaging time frame that includes the location and the imaging time of the designated candidate imaging location 171 is selected. The screen display is then changed from the condition search screen 82 to the imaging time frame details selection screen 83.

<6. Imaging Time Frame Details Selection Screen>

Figure 7:
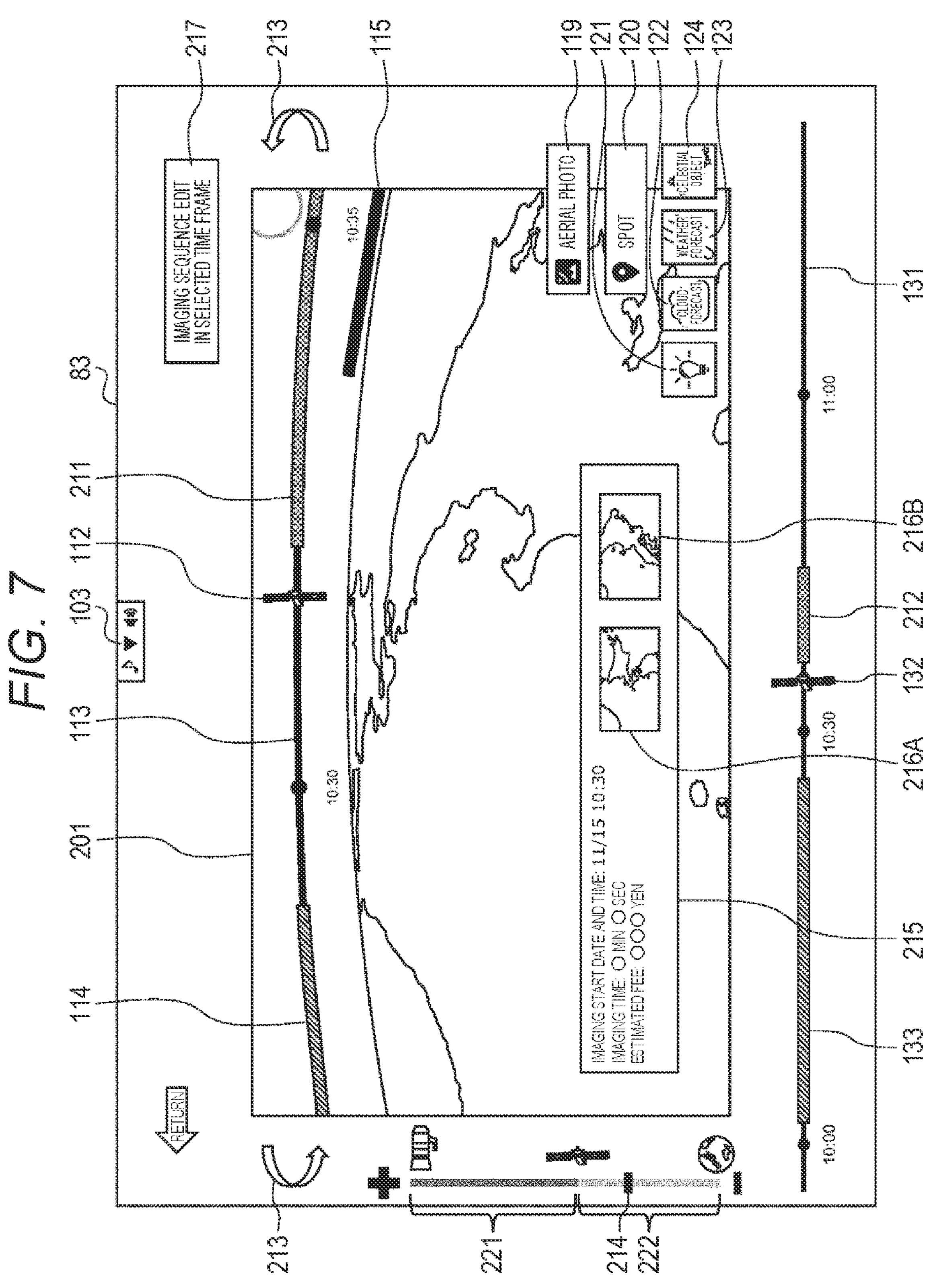
FIG. 7 is a diagram illustrating an example screen of an imaging time frame details selection screen.

FIG. 7 illustrates an example screen of the imaging time frame details selection screen 83.

Note that, on the imaging time frame details selection screen 83 in FIG. 7, the same display items as those on the area selection screen 81 shown in FIG. 4 are denoted by the same reference numerals as those in FIG. 4, and explanation of those items is not made herein.

On the imaging time frame details selection screen 83, a camera image display unit 201 is disposed in a large area at the center of the screen. On the initial screen of the imaging time frame details selection screen 83, an image by a free viewpoint camera (a free viewpoint camera image) is displayed on the camera image display unit 201. The angle of view of the free viewpoint camera is displayed in the range corresponding to a time width several times the imaging time frame, for example. Together with the free viewpoint camera image on the camera image display unit 201, the satellite 112 and the predicted orbit 113 are also displayed, and the unreservable time zones 114 and the satellite imaging range 115 are further displayed. However, since the satellite imaging range 115 is not displayed in a wide area like the area selection screen 81 shown in FIG. 4, the satellite imaging range 115 is not in a circular shape like the area selection screen 81, but in a linear shape like the horizon line.

In addition to the unreservable time zones 114, an imaging time frame 211 selected on the area selection screen 81 or the condition search screen 82 is further displayed on the predicted orbit 113.

When the user clicks on the predicted orbit 113 with a mouse or the like, the time at the center of the imaging time frame 211 moves to the center in the lateral direction of the camera image display unit 201. Thus, the imaging time frame 211 can be moved forward or backward on the predicted orbit 113.

The satellite 112 or the satellite camera can be rolled with a roll button 213 displayed outside the predicted orbit 113 on the camera image display unit 201. The satellite 112 or the satellite camera rotates in a predetermined rotational direction while the roll button 213 is being pressed.

The user can cause the free viewpoint camera to zoom in/out by moving up or down a zoom bar 214 disposed on the left side of the camera image display unit 201. The zoom bar 214 moves in a range including a satellite camera viewpoint 221 and a free viewpoint camera viewpoint 222. The current zoom level can be checked from the position of the zoom bar 214. As the zoom bar 214 is moved, the zoom level can be adjusted, and images by the free viewpoint camera and the satellite camera are seamlessly switched.

FIG. 8 illustrates a situation in which the zoom bar 214 is operated, and the camera image display unit 201 is switched from a free viewpoint camera image to a satellite camera viewpoint image.

When the zoom bar 214 at the position of the free viewpoint camera viewpoint 222 is gradually moved in the direction of the satellite camera viewpoint 221, the free viewpoint camera approaches the satellite 112 and zooms in.

When the zoom bar 214 moves from the position of the free viewpoint camera viewpoint 222 to the position of the satellite camera viewpoint 221, the image on the camera image display unit 201 seamlessly switches from the free viewpoint camera image to the satellite camera viewpoint image. The satellite camera viewpoint image is an image to be actually captured by the satellite camera using an image captured in the past. When the zoom bar 214 moves to the end of the satellite camera viewpoint 221, the satellite camera viewpoint image on the camera image display unit 201 becomes an image at the maximum zoom value of the satellite camera.

Note that, in a case where the satellite 112 is zoomed out too much and becomes too small, the satellite 112 is displayed in an enlarged state, regardless of the actual ratio.

In a case where the position of the free viewpoint camera falls into the earth, the earth is displayed transparently, and celestial objects such as constellations and the sun are displayed on the camera image display unit 201 from the earth side.

In a case where a plurality of satellites 21 corresponding to the satellite 112 is equipped with zoom lenses having different magnifications, and is performing a formation flight, it is possible to display the satellite camera viewpoint image as one continuous zoom operation on the camera image display unit 201, by interlocking zoom operations of the plurality of satellites 21 having different zoom magnifications with the operation of the zoom bar 214 at the satellite camera viewpoint 221.

Referring back to FIG. 7, on the imaging time frame details selection screen 83, an imaging condition display unit 215 is displayed and superimposed on the camera image display unit 201. The imaging condition display unit 215 displays imaging conditions such as the imaging start date and time, the imaging time, and the fee for the currently selected imaging time frame. Also, satellite images 216A and 216B as imaged examples captured in the past in the same time zone as the currently selected imaging time frame are displayed. The satellite images 216A and 216B are highly evaluated imaged examples among imaged examples captured in the past in the same time zone as the currently selected imaging time frame, for example. The user can check the imaging conditions on the imaging condition display unit 215 and the imaged examples of the satellite images 216A and 216, to determine whether or not to set the current imaging time frame.

The time slider 131, the satellite 132, and the unreservable time zones 133 are displayed below the camera image display unit 201, as on the area selection screen 81 in FIG. 4. Further, an imaging time frame 212 corresponding to the imaging time frame 211 on the camera image display unit 201 is also displayed.

The user can move the satellite 132 on the time slider 131 by clicking a predetermined point on the time slider 131 or dragging the satellite 132 on the time slider 131, as on the area selection screen 81.

When the position of the satellite 132 on the time slider 131 is changed, the satellite 112, the predicted orbit 113, the time on the predicted orbit 113, and the like on the camera image display unit 201 are also changed accordingly (synchronously). Further, in a case where the respective buttons of the cloud forecast switching button 122, the weather forecast switching button 123, and the celestial object switching button 124 are on, the celestial objects, the cloud forecast, and the rain forecast are also changed to those corresponding to the time after the movement.

In a case where the user changes the position of the satellite 112 or the imaging time frame 211 on the camera image display unit 201, the time axis of the time slider 131 is also changed in accordance with (in synchronization with) the changed positions on the camera image display unit 201.

At the upper right of the imaging time frame details selection screen 83, an imaging sequence edit transition button 217 is disposed. On the imaging sequence edit transition button 217, the characters "imaging sequence edit in selected time frame" are displayed. After determining the imaging time frame 211, the user presses the imaging sequence edit transition button 217, to change the screen display from the imaging time frame details selection screen 83 to the imaging sequence editing screen 84.

<7. Imaging Sequence Editing Screen>

Figure 9:
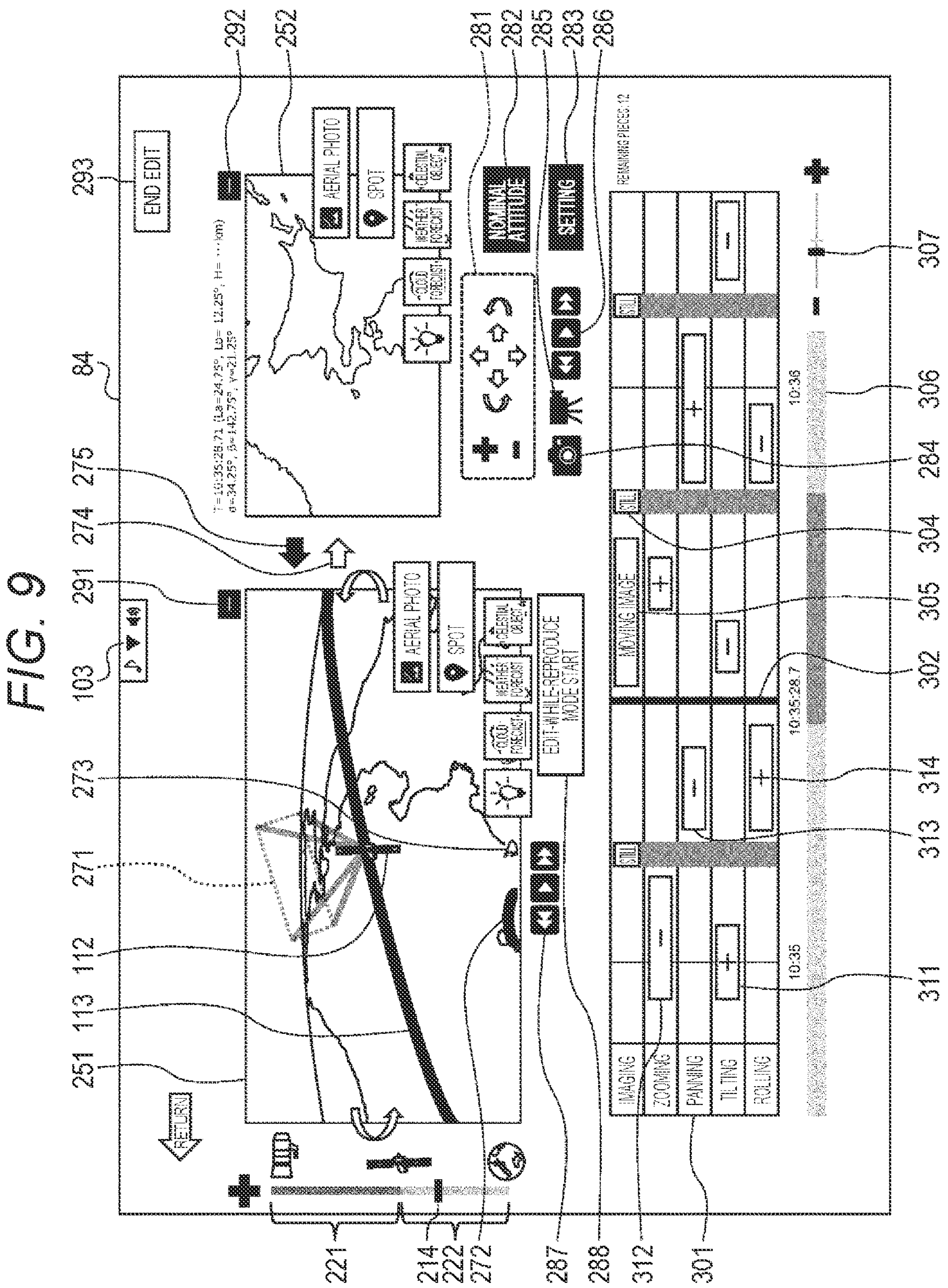
FIG. 9 is a diagram illustrating an example screen of an imaging sequence editing screen in a "normal edit mode".

FIG. 9 illustrates an example screen of the imaging sequence editing screen 84.

Note that, in FIG. 9, the same reference numerals are given to the same portions as those on the respective screens in FIGS. 4 to 8, or the reference numerals are omitted for them, and explanation of those portions is not made herein.

The imaging time frame details selection screen 83 shown in FIG. 7 includes only one camera image display unit 201 as the display unit for the earth image. On the other hand, the imaging sequence editing screen 84 in FIG. 9 includes the two display units of a camera image display unit 251 disposed on the left side, and an imaging preview display unit 252 disposed on the right side.

The camera image display unit 251 disposed on the left side is basically similar to the camera image display unit 201 of the imaging time frame details selection screen 83, and has the same operability. By operating the zoom bar 214, it is possible to seamlessly switch the image of the camera image display unit 251 between a free viewpoint camera image and a satellite camera viewpoint image.

An angle-of-view indicator 271 indicating the current orientation and the angle of view of the camera is displayed on the camera image display unit 251. An orbit on/off button 272 and an imaging range on/off button 273 are also added and displayed on the camera image display unit 251. The orbit on/off button 272 is a button for switching whether or not to display the predicted orbit 113 on the camera image display unit 251. The imaging range on/off button 273 is a button for switching whether or not to display the satellite imaging range 115 on the camera image display unit 251.

The imaging preview display unit 252 disposed on the right side displays a satellite camera image that is an image to be actually captured by the satellite camera.

A right arrow button 274 disposed between the camera image display unit 251 and the imaging preview display unit 252 is operated in a case where the satellite camera viewpoint image displayed on the camera image display unit 251 is copied onto the imaging preview display unit 252. However, the right arrow button 274 cannot be pressed, unless the position of the zoom bar 214 is at the satellite camera viewpoint 221.

A left arrow button 275 disposed between the camera image display unit 251 and the imaging preview display unit 252 is operated in a case where the image on the camera image display unit 251 is made the same as the satellite camera image on the imaging preview display unit 252.

An operation button group 281 for performing the respective camera operations of panning, tilting, rolling, and zooming of the satellite camera is disposed below the imaging preview display unit 252, and, when the operation button group 281 is operated, the satellite camera image on the imaging preview display unit 252 is changed accordingly. It is also possible to change the orientation of the satellite camera image on the imaging preview display unit 252 by dragging the inside of the screen of the imaging preview display unit 252. In a case where an operation on the operation button group 281 exceeds the movable range of the satellite camera, an alert screen 321 as illustrated in FIG. 10 is displayed, for example.

Figure 10:
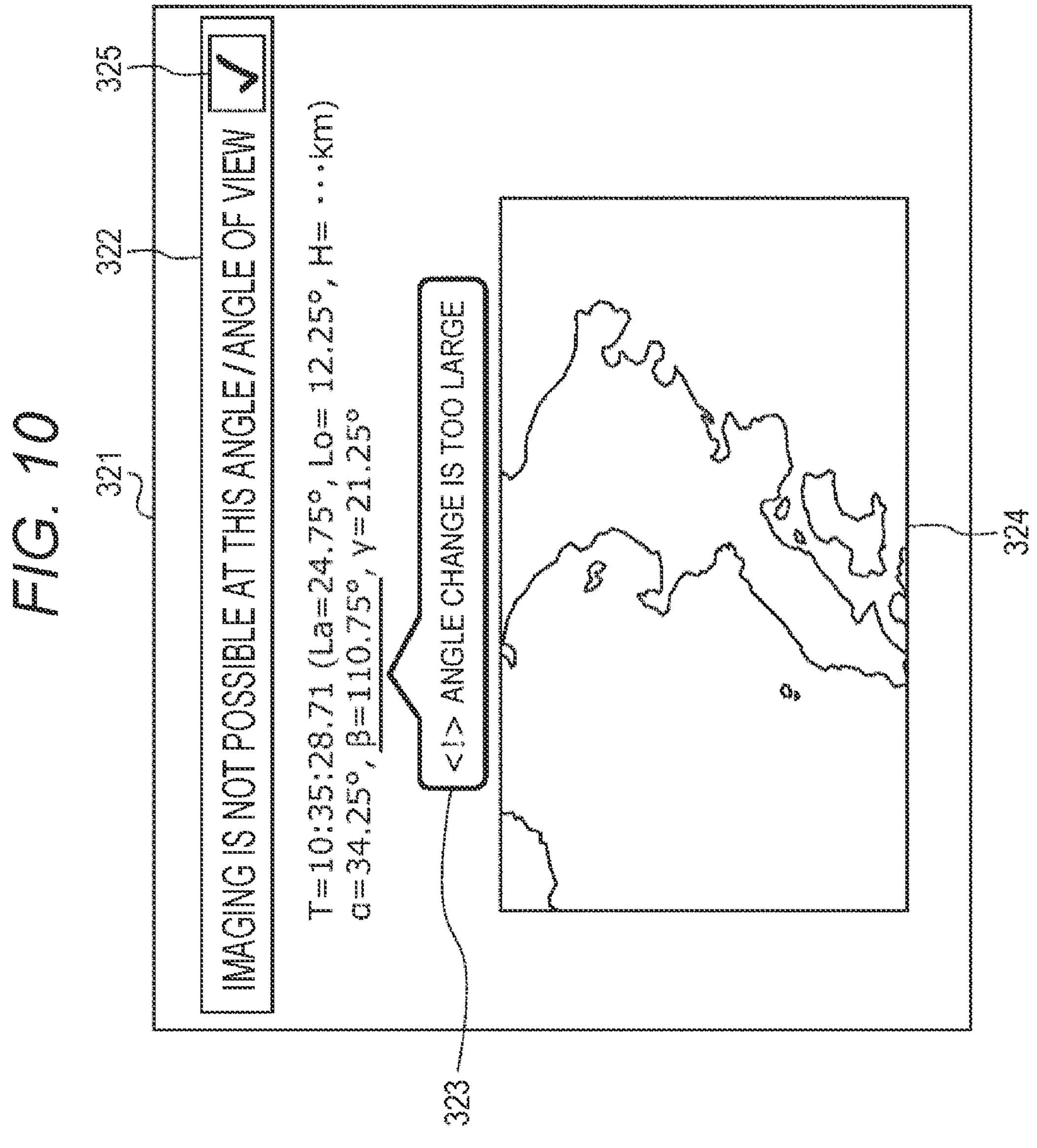
FIG. 10 is a diagram illustrating an example screen of an alert screen.

On the alert screen 321 in FIG. 10, a message 322 that reads "imaging cannot be performed at this angle/angle of view", and setting values (control values) to be set for the satellite camera and the satellite 112 are displayed, for example. Further, a message 323 that reads "the angle change is too large", and a satellite camera image 324 to be actually captured by the satellite camera are displayed.

On the alert screen 321, an abnormal setting value (control value) to be set for the satellite camera and the satellite 112 is displayed in an emphasized manner. In the example in FIG. 10, the display in an emphasized manner is an underlined display, but the display in an emphasized manner is not limited to this. For example, the color of the characters indicating an abnormal setting value may be made different from the color of the characters indicating other values in the normal ranges. When an OK button 325 is pressed, the alert screen 321 is erased.

Referring back to FIG. 9, a nominal attitude button 282 to the right of the operation button group 281 is pressed when the satellite 112 is returned to a nominal attitude that is the default attitude. The nominal attitude is the attitude and the angle of view at which the ratio of the earth to the space is 1:0.61 (golden ratio), with the satellite camera facing in the orbital traveling direction. Note that the default attitude of the satellite 112 is not necessarily the nominal attitude, and some other attitude may be set as the default attitude.

A setting button 283 is pressed when a setting value of the satellite camera is changed. For example, an imaging mode, an exposure value (EV), a shutter speed (SS), an aperture value (F-number), and an ISO sensitivity can be set through a window that is displayed when the setting button 283 is pressed. The imaging mode may be an auto mode, a program (P) mode, an aperture priority (A) mode, a shutter priority(S) mode, a manual (M) mode, or the like.

A minimization button 291 at the upper right of the camera image display unit 251 is pressed when the camera image display unit 251 is minimized. A minimization button 292 on the imaging preview display unit 252 is pressed when the imaging preview display unit 252 is minimized.

A reproduction button group 287 disposed below the camera image display unit 251 is pressed when the imaging time is set forward or backward to move the satellite 112 along the predicted orbit 113 and reproduce the image on the camera image display unit 251.

Below the operation button group 281, a still image capture button 284 for capturing a still image, and a moving image capture button 285 for capturing a moving image are disposed. A reproduction button group 286 is disposed on the right side of the moving image capture button 285. The reproduction button group 286 is pressed when the imaging time is set forward or backward to move the satellite 112 along the predicted orbit 113 and reproduce the satellite camera image on the imaging preview display unit 252. The reproduction button group 286 or the reproduction button group 287 may be operated so that images on the camera image display unit 251 and the imaging preview display unit 252 are reproduced in synchronization with each other.

The user operates the reproduction button group 286 or the reproduction button group 287 while referring to one or both of the camera image display unit 251 and the imaging preview display unit 252, and determines an imaging timing for capturing a still image or a moving image. In a case where the user has determined an imaging timing for capturing a still image, the user presses the still image capture button 284. Further, in a case where the user has determined an imaging timing for capturing a moving image, the user presses the moving image capture button 285.

When the still image capture button 284 or the moving image capture button 285 is pressed, a still image mark 304 representing still image capturing or a moving image mark 305 representing moving image capturing is displayed at an imaging time at which a timeline 301 is pressed. The still image mark 304 or the moving image mark 305 may be expressed by a symbol or a drawing, instead of display of characters such as "still" and "moving image".

The timeline 301 displays the time axis of the imaging time frame 211 determined on the imaging time frame details selection screen 83. A scroll bar 306 is operated so that any desired position of the imaging time frame 211 can be displayed on the timeline 301. With a zoom bar 307, it is possible to enlarge or reduce the timeline 301.

A current position bar 302 displayed on the timeline 301 corresponds to the position and time of the satellite 112 displayed on the camera image display unit 251 and the imaging preview display unit 252. In other words, the state of the satellite 112 at the position and time of the current position bar 302 is displayed on the camera image display unit 251 and the imaging preview display unit 252.

The imaging timings for a still image and a moving image designated by the user, and the camera operations of zooming, panning, tilting, and rolling designated by the user are displayed in time series on the timeline 301. For example, in a case where an operation of tilting the satellite camera is performed at a predetermined imaging time, the user performs clicking or the like to designate the row space at the imaging time at which the tilting is to be performed. A tilting operation bar 311 is then displayed at the imaging time designated by the clicking or the like. The newly added tilting operation bar 311 can be dragged with a mouse or the like, to change the time (perform movement in the time axis direction). It is also possible to change the operation time of the tilting operation by dragging both ends of the tilting operation bar 311. In a case where the tilting operation bar 311 is deleted, the designated operation is canceled. The same applies to a zooming operation bar 312, a panning operation bar 313, and a rolling operation bar 314.

On the imaging sequence editing screen 84, in a case where editing of the imaging sequence is finished, an edit end button 293 at the upper right of the screen is pressed. When the edit end button 293 is pressed, the data of the imaging sequence created on the imaging sequence editing screen 84 is stored into the storage unit 55.

The imaging sequence editing screen 84 has the "edit-while-reproduce mode" in which, while the reproduction button group 286 is operated to reproduce a satellite camera viewpoint image, the operation button group 281 is operated to perform panning, tilting, rolling, zooming, or the like of the satellite camera, and cause the timeline 301 to sequentially reflect the camera operations performed during the reproduction. The "edit-while-reproduce mode" is a mode for determining imaging conditions while reproducing an imaging preview moving image, and is a mode suitable for editing a moving image sequence. Further, the "edit-while-reproduce mode" can also be used for practicing camera operations at a time of real-time imaging.

In a case where an imaging sequence is created in the "edit-while-reproduce mode", an edit-while-reproduce mode start button 288 disposed below the camera image display unit 251 is pressed.

Figure 11:
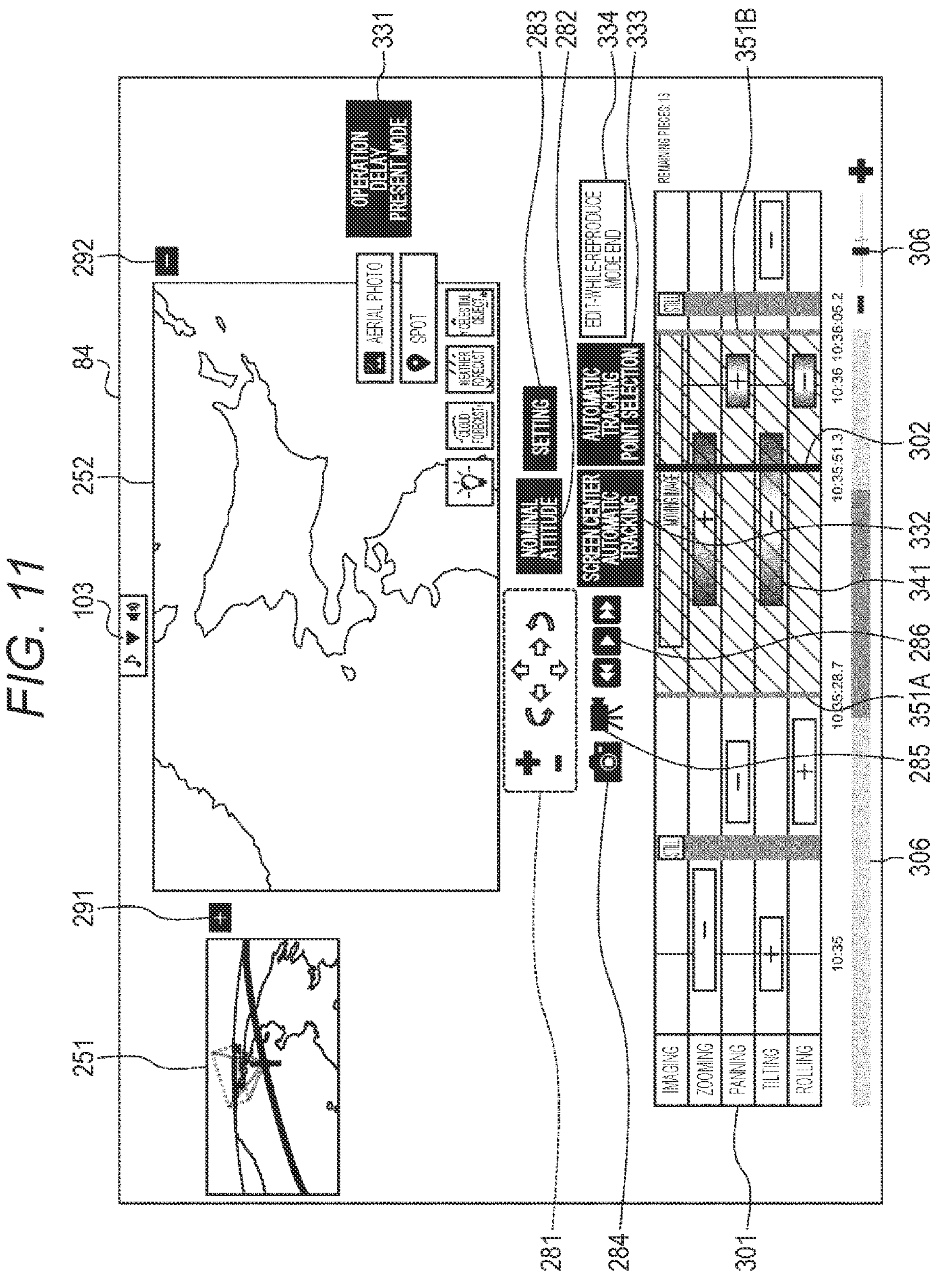
FIG. 11 is a diagram illustrating an example screen of the imaging sequence editing screen in an "edit-while-reproduce mode".

FIG. 11 illustrates an example screen of the imaging sequence editing screen 84 in a case where the edit-while-reproduce mode start button 288 is pressed, and the "edit-while-reproduce mode" is executed.

Note that, in FIG. 11, the same reference numerals are also given to the same portions as those on the respective screens in FIGS. 4 to 9, or the reference numerals are also omitted for them, and explanation of those portions is not made herein.

Comparison between the imaging sequence editing screen 84 in the "edit-while-reproduce mode" and the imaging sequence editing screen 84 in the "normal edit mode" illustrated in FIG. 9 shows that the camera image display unit 251 located on the left side is minimized. Also, the imaging preview display unit 252 is larger than the imaging preview display unit 252 in the "normal edit mode", and the operation button group 281, the nominal attitude button 282, the setting button 283, the still image capture button 284, the moving image capture button 285, the reproduction button group 286, and the like are arranged in the central portion on the imaging sequence editing screen 84.

Also, an operation delay present mode button 331, a screen center automatic tracking button 332, and an automatic tracking point selection button 333 are added to the imaging sequence editing screen 84 in the "edit-while-reproduce mode". An edit-while-reproduce mode end button 334 for ending the "edit-while-reproduce mode" is provided in place of the edit-while-reproduce mode start button 288.

Further, reproduction range bars 351A and 351B indicating the range in which editing while reproducing is to be performed are added to the left and right of the current position bar 302 on the timeline 301. The reproduction range bar 351A represents the start point of the time frame in which editing is to be performed in the "edit-while-reproduce mode", and the reproduction range bar 351B represents the end point of the time frame in which editing is to be performed in the "edit-while-reproduce mode". The positions of the reproduction range bars 351A and 351B can be moved by a dragging action, for example. Except for the time frame from the reproduction range bar 351A to the reproduction range bar 351B, priority is put on the existing imaging sequence that has been set in the "normal edit mode".

When the user presses the moving image capture button 285 and has the imaging preview moving image reproduced, the current position bar 302 starts to move rightward from the position of the reproduction range bar 351A toward the position of the reproduction range bar 351B, and the satellite camera image on the imaging preview display unit 252 changes (is reproduced) with the position of the current position bar 302.

When the user operates the respective buttons of the operation button group 281 to perform zooming, panning, tilting, or rolling of the satellite camera while checking the satellite camera image on the imaging preview display unit 252, a zooming operation bar, a panning operation bar, a tilting operation bar, or a rolling operation bar is displayed on the timeline 301 in accordance with the performed camera operation. For example, as in a tilting operation bar 341, the operation speeds of zooming, panning, tilting, and rolling are expressed by color densities.

When the moving image capture button 285 for ending reproduction is not pressed, and the current position bar 302 moves beyond the position of the reproduction range bar 351B, the reproduction range bar 351B also changes with the movement of the current position bar 302. That is, the end point of the time frame in which editing is to be performed in the "edit-while-reproduce mode" is extended.

Figure 12:
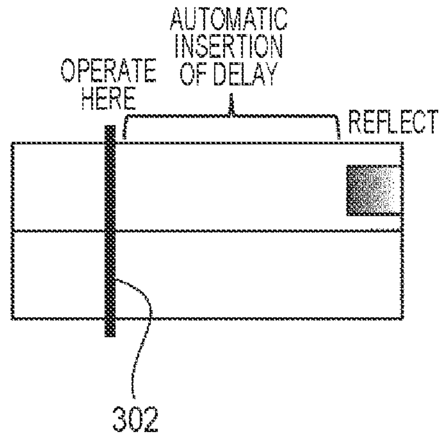
FIG. 12 is a diagram for explaining an "operation delay present mode".

The operation delay present mode button 331 is a button for turning on and off an "operation delay present mode". The "operation delay present mode" is a mode in which an actual delay time from when the user performs an operation till when the operation is transmitted to the satellite 21 is inserted. When the "operation delay present mode" is turned on, the actual delay time from when the user performs an operation till when the operation is transmitted to the satellite 21 is automatically inserted, and an operation bar is displayed, as illustrated in FIG. 12. The "operation delay present mode" is useful for practicing real-time imaging.

The screen center automatic tracking button 332 is a button for turning on and off a mode for automatically tracking the screen center. When this button is pressed, panning, tilting, and rolling operations are automatically performed so that the earth's surface or a celestial object located at the center of the screen at the time of the pressing is maintained at the center of the screen at all times. The mode for automatically tracking the screen center is canceled when the screen center automatic tracking button 332 is pressed again, or the respective buttons of the operation button group 281 are operated.

The automatic tracking point selection button 333 is a button for setting an automatic tracking point. After this button is pressed, a point on the satellite camera image displayed on the imaging preview display unit 252 is clicked, so that the satellite camera operates to automatically track the point.

Figure 13:
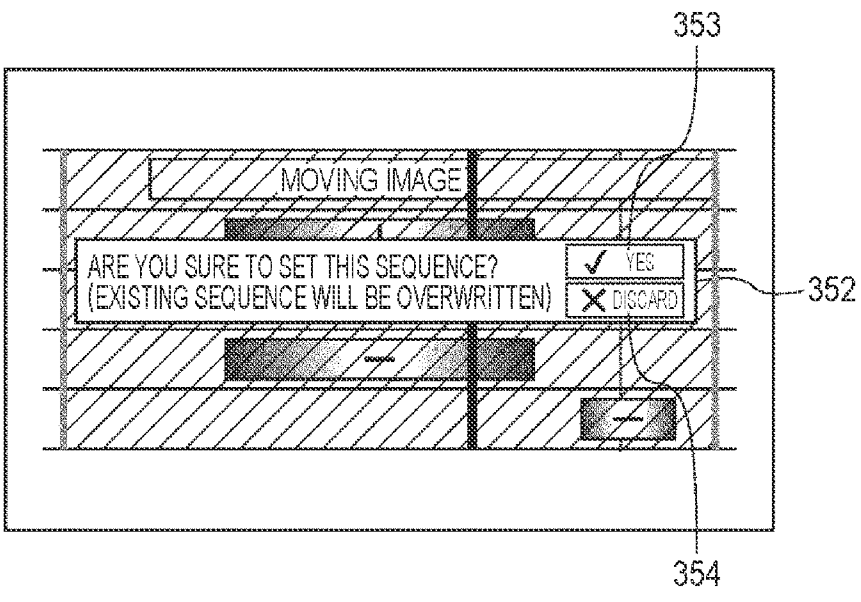
FIG. 13 is a diagram for explaining an imaging sequence overwrite confirmation message at a time when an edit-while-reproduce mode end button is pressed.

In a case where the "edit-while-reproduce mode" is to be ended, the user presses the edit-while-reproduce mode end button 334. When the edit-while-reproduce mode end button 334 is pressed, an imaging sequence overwrite confirmation message 352 illustrated in FIG. 13 is displayed, for example.

A message that reads "are you sure to set this sequence? (the existing sequence will be overwritten)" is displayed in the imaging sequence overwrite confirmation message 352. When an enter button 353 is pressed, the contents of the imaging sequence from the reproduction range bar 351A to the reproduction range bar 351B in "edit-while-reproduce mode" are overwritten and updated with the imaging sequence in the "normal edit mode". When a discard button 354 is pressed, the contents of the imaging sequence in the "edit-while-reproduce mode" are discarded, and the screen returns to the imaging sequence editing screen 84 in the "normal edit mode".

Figure 14:
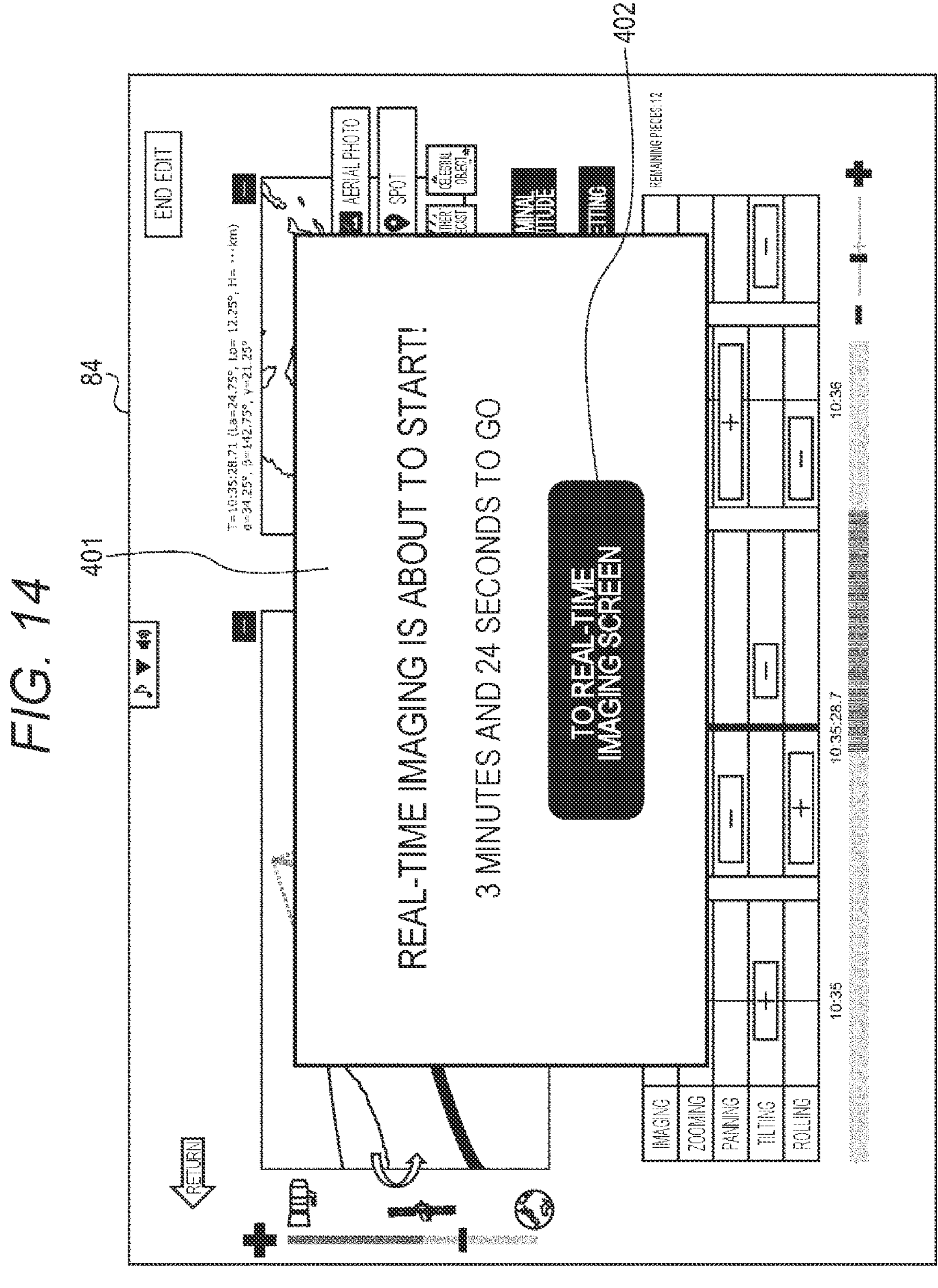
FIG. 14 is a diagram for explaining a real-time imaging start notification.

When the imaging time in a reservation sequence that is another imaging sequence created beforehand by the user approaches during creation of an imaging sequence in the "normal edit mode" or the "edit-while-reproduce mode", a real-time imaging start notification 401 illustrated in FIG. 14 is displayed on the imaging sequence editing screen 84.

In the real-time imaging start notification 401 in FIG. 14, the time till the start of real-time imaging, and a real-time imaging screen transition button 402 for transition to the real-time imaging screen 85 are displayed together with a message that reads "real-time imaging is about to start!".

Figure 15:
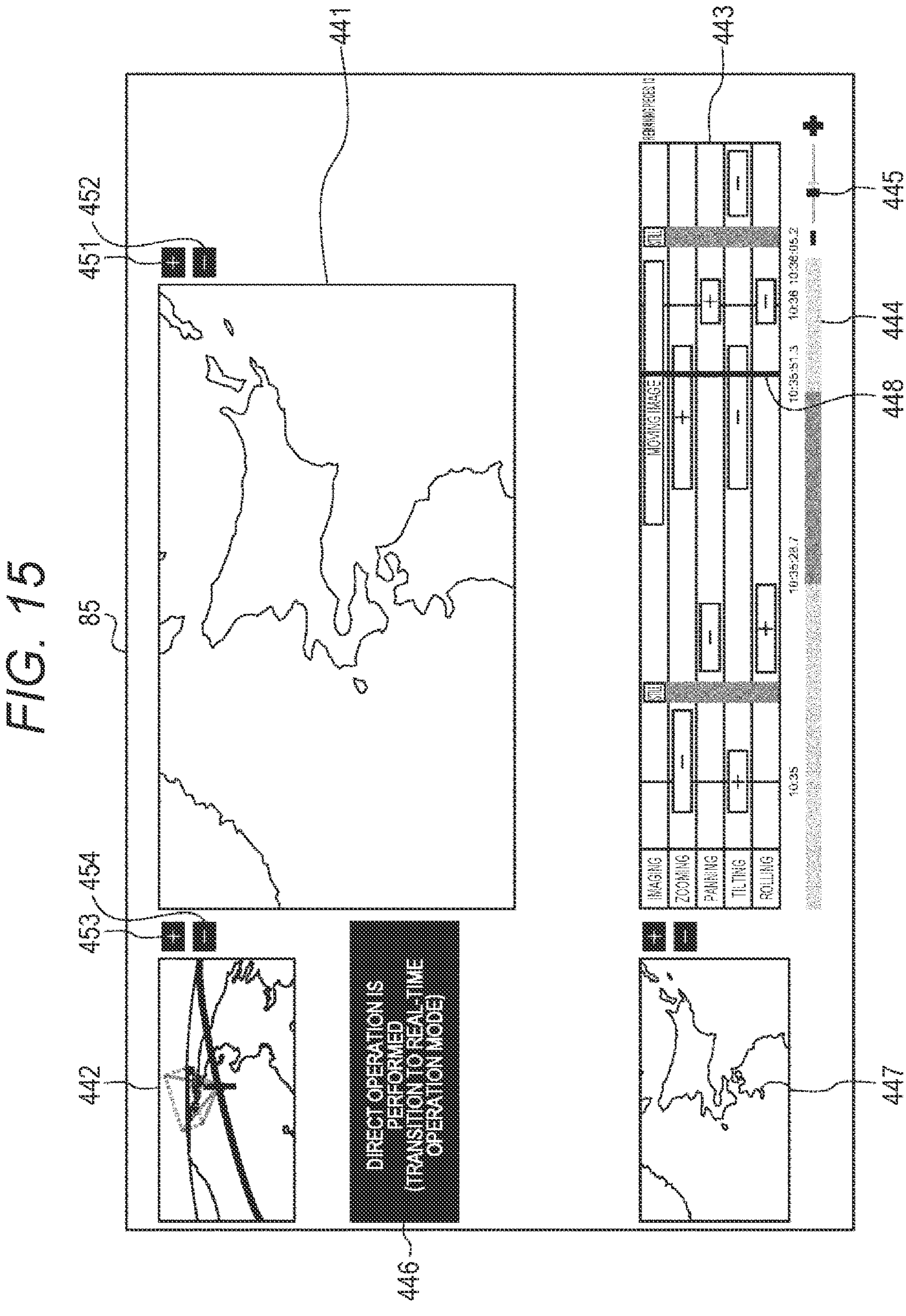
FIG. 15 is a diagram illustrating an example screen of a real-time imaging screen in a "reservation sequence operation mode".

When the user presses the real-time imaging screen transition button 402, the real-time imaging screen 85 illustrated in FIG. 15 is displayed.

<8. Real-Time Imaging Screen>

FIG. 15 illustrates an example screen of the real-time imaging screen 85.

The real-time imaging screen 85 in FIG. 15 is a screen in the "reservation sequence operation mode" in which the satellite 21 is controlled in accordance with a reservation sequence, and the satellite camera image being actually captured by the satellite 21 is displayed.

The real-time imaging screen 85 has a real-time video display unit 441 that is located at the center of the screen, and displays a video image being actually captured by the satellite 21 in real time. On the left side of the real-time video display unit 441, a free viewpoint video display unit 442 that displays a free viewpoint camera video image in real time is disposed.

Note that, in a case where the imaging time in the reservation sequence approaches at a timing not during creation of an imaging plan, the real-time imaging screen 85 displaying an imaging preview moving image corresponding to the current time is displayed on the real-time video display unit 441. A message that reads "real-time imaging starts in . . . minutes and . . . seconds", for example, is then superimposed and displayed on the imaging preview moving image on the real-time video display unit 441, and, when the real-time imaging start time comes, the imaging preview moving image on the real-time video display unit 441 is switched to the video image being actually captured by the satellite 21.

The real-time video display unit 441 can be maximized or minimized with a maximization button 451 and a minimization button 452 disposed at the upper right of the real-time video display unit 441. The free viewpoint video display unit 442 can be maximized or minimized with a maximization button 453 and a minimization button 454 disposed at the upper right of the free viewpoint video display unit 442.

A timeline 443 disposed below the real-time video display unit 441 displays the contents of the reservation sequence, and a current position bar 448 moves as the current time passes. The contents of the reservation sequence cannot be changed.

Like the scroll bar 306 on the imaging sequence editing screen 84, a scroll bar 444 can indicate any desired position in the reservation sequence on the timeline 443. Like the zoom bar 307 on the imaging sequence editing screen 84, a zoom bar 445 can enlarge or reduce the timeline 443.

On the left side of the timeline 443, a scheduled video display unit 447 that displays a satellite camera image created in the reservation sequence is disposed. The user can compare the satellite camera image displayed on the scheduled video display unit 447 with the real-time satellite camera image displayed on the real-time video display unit 441, to check whether imaging is being performed as scheduled.

A real-time operation mode transition button 446 for transition to the "real-time operation mode" in which the user operates the satellite 21 in real time to capture an image is disposed between the free viewpoint video display unit 442 and the scheduled video display unit 447. The characters of "perform a direct operation (transition to the real-time operation mode)" are displayed on the real-time operation mode transition button 446. Transition to the "real-time operation mode" can be made at any time.

Figure 16:
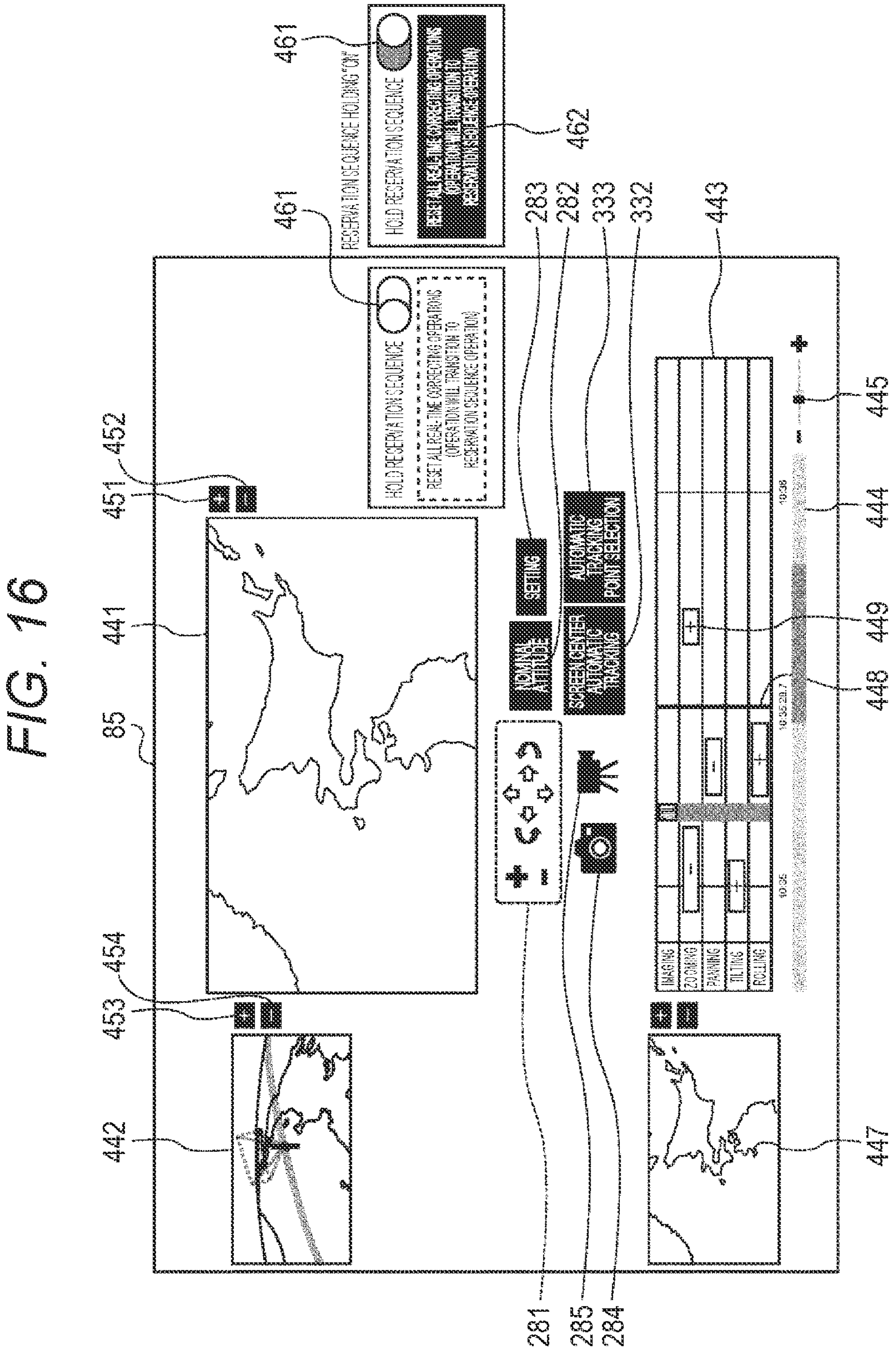
FIG. 16 is a diagram illustrates an example screen of the real-time imaging screen in a "real-time operation mode".

When the real-time operation mode transition button 446 is pressed by the user, the real-time imaging screen 85 in "real-time operation mode" in FIG. 16 is displayed.

FIG. 16 illustrates an example screen of the real-time imaging screen 85 in the "real-time operation mode".

On the real-time imaging screen 85 in the "real-time operation mode", the real-time operation mode transition button 446 is erased, and instead, the operation button group 281, the nominal attitude button 282, the setting button 283, the still image capture button 284, the moving image capture button 285, the screen center automatic tracking button 332, and the automatic tracking point selection button 333 are added.

Each of these buttons is similar to that displayed on the imaging sequence editing screen 84, and therefore, explanation thereof is not made herein.

In the "real-time operation mode", it is possible to operate the satellite camera by operating the respective buttons and the like of the operation button group 281 in real time, and acquire a satellite camera image different from that in the reservation sequence.

A reservation sequence holding switch 461 as to whether to hold the reservation sequence is displayed on the real-time imaging screen 85 in the "real-time operation mode". The example of the real-time imaging screen 85 in FIG. 16 illustrates an example in which the reservation sequence holding switch 461 is in an off-state. An example in which the reservation sequence holding switch 461 is in an on-state is shown outside the real-time imaging screen 85.

In a case where the reservation sequence holding switch 461 is in an off-state, the reservation sequence on the timeline 443 is erased, and operation bars corresponding to the respective button operations of the operation button group 281 are reflected on the timeline 443. When the user operates each button of the operation button group 281 to performing zooming, panning, tilting, or rolling of the satellite camera, a user operation command corresponding to the operation is transmitted from the service providing server 41 of the service operation application 42 to the satellite group management device 11 in real time. The user operation command is converted into a satellite control command by the satellite group management device 11, and is transmitted from the satellite group management device 11 to the satellite 21 via the communication device 13. For example, when the user performs a zooming operation at the point of time of the current position bar 448, a zooming operation bar 449 is reflected on the timeline 443, including the actual delay time until the transmission to the satellite 21.

In a case where the reservation sequence holding switch 461 is in an on-state, the reservation sequence on the timeline 443 is displayed in a semitransparent form, and the contents of the reservation sequence become visible. In this state, the user can also press a reset button 462. The reset button 462 is a button for resetting all real-time correcting operations, and shifting to the "reservation sequence operation mode". When the reset button 462 is pressed, the service operation application 42 changes the reservation sequence to be transmitted to the satellite 21, and the satellite 21 smoothly transitions to a state with the reservation sequence. After the transition to the "reservation sequence operation mode", the real-time imaging screen 85 in FIG. 15 is displayed again.

<9. Flow of an Imaging Plan Creation Process>

Figure 17:
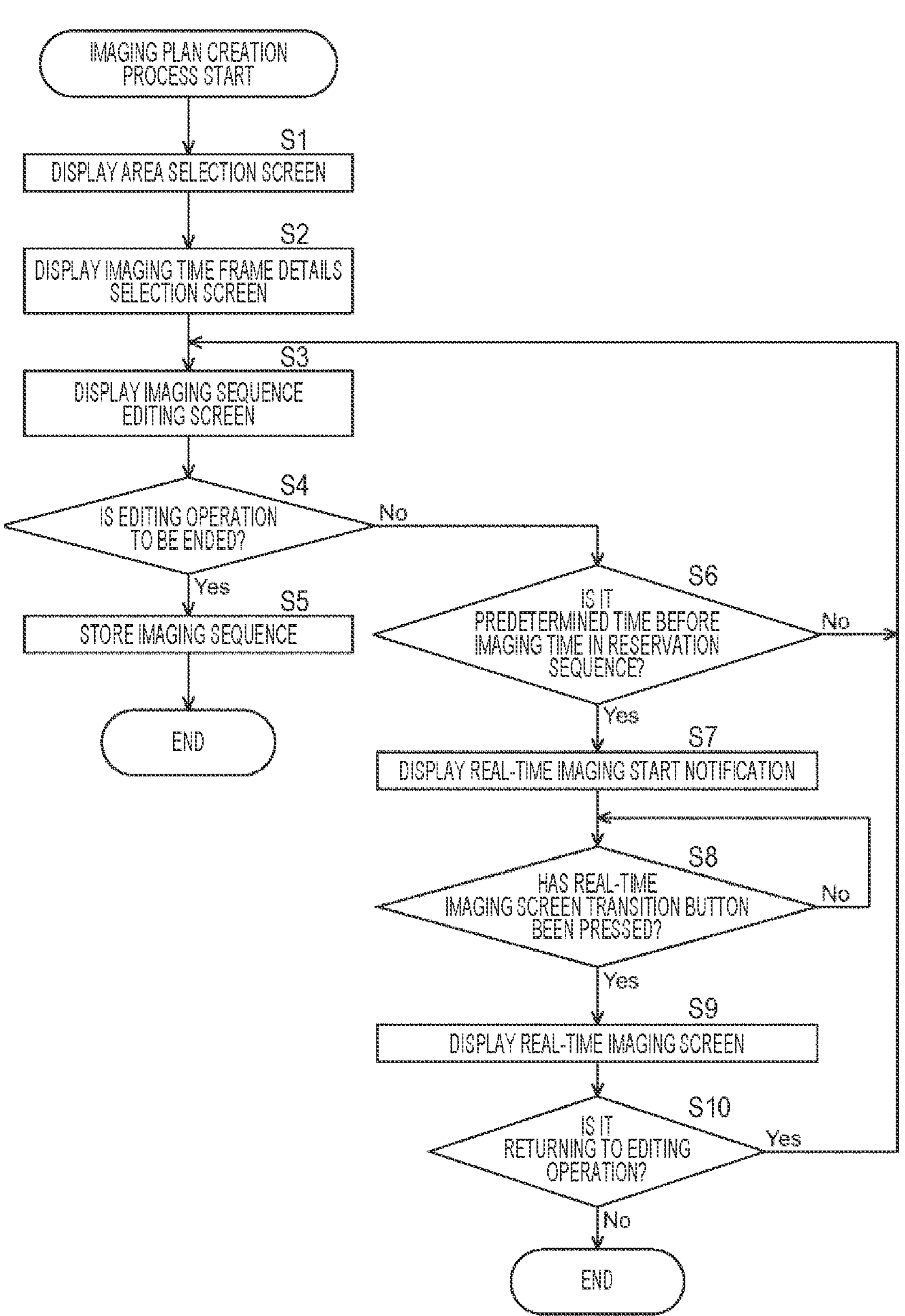
FIG. 17 is a flowchart for explaining an imaging plan creation process to be performed by the service operation application.

Next, an imaging plan creation process to be performed by the service operation application 42 is described with reference to a flowchart shown in FIG. 17. This process is started when the user presses the "imaging plan creation" button on the start screen displayed on the user application 44, for example.

First, in step S1, the service operation application 42 causes the user application 44 of the user terminal 43 to display the area selection screen 81. On the area selection screen 81, the user can determine (designate) a general location and time at which the satellite 21 is to perform imaging, as described above with reference to FIG. 4. Alternatively, the user may press the search button 117 on the area selection screen 81 to display the condition search screen 82, designate a keyword such as a landmark, the time zone of the imaging location, or the like as a search condition, and determine a desired imaging location and a desired imaging time from among the imaging locations and the imaging times that match the search condition. After a general imaging location and a general imaging time are determined on the area selection screen 81 or the condition search screen 82, the process moves on to step S2.

In step S2, the service operation application 42 causes the user application 44 of the user terminal 43 to display the imaging time frame details selection screen 83. On the imaging time frame details selection screen 83, the user can determine in which imaging time frame 211 imaging is to be performed, while checking a free viewpoint camera image and a satellite camera image, as described above with reference to FIG. 7 and others. After the user determines the imaging time frame 211 and presses the imaging sequence edit transition button 217, the process moves on to step S3.

In step S3, the service operation application 42 causes the user application 44 of the user terminal 43 to display the imaging sequence editing screen 84 shown in FIG. 9. On the imaging sequence editing screen 84, the user can operate the timeline 301 or the operation button group 281, to designate the start and end of each operation of zooming, panning, tilting, and rolling of the satellite camera, a timing for capturing a still image or a moving image, and the like. The user can also press the edit-while-reproduce mode start button 288 on the imaging sequence editing screen 84, to create an imaging sequence in the "edit-while-reproduce mode".

In step S4, the service operation application 42 determines whether to end the editing operation, or, in other words, whether the edit end button 293 on the imaging sequence editing screen 84 has been pressed by the user.

If it is determined in step S4 that the editing operation is to be ended, or, in other words, if the edit end button 293 on the imaging sequence editing screen 84 has been pressed by the user, the process moves on to step S5. In step S5, the service operation application 42 stores the data of the imaging sequence created on the imaging sequence editing screen 84 into the storage unit 55, and ends the imaging plan creation process.

If it is determined in step S4 that the editing operation is not to be ended yet, or, in other words, if the edit end button 293 has not been pressed, on the other hand, the process moves on to step S6.

In step S6, the service operation application 42 determines whether it is a predetermined time (five minutes, for example) before the imaging time in the reservation sequence. If it is determined in step S6 that it is not yet the predetermined time before the imaging time in the reservation sequence, the process returns to step S3, and the process in and after step S3 described above is performed. That is, the creation of the imaging sequence on the imaging sequence editing screen 84 is continued.

If it is determined in step S6 that it is the predetermined time before the imaging time in the reservation sequence, on the other hand, the process moves on to step S7, and the service operation application 42 performs an operation so that the real-time imaging start notification 401 shown in FIG. 14 is displayed.

In step S8, the service operation application 42 determines whether the real-time imaging screen transition button 402 on the real-time imaging start notification 401 has been pressed. The process in step S8 is continued until the real-time imaging screen transition button 402 is pressed, and, when the real-time imaging screen transition button 402 is pressed, the process moves on to step S9.

In step S9, the service operation application 42 performs an operation so that the real-time imaging screen 85 shown in FIG. 15 is displayed. The real-time imaging screen 85 in FIG. 15 is a screen in the "reservation sequence operation mode" in which the contents of the reservation sequence cannot be changed, but the user can also set the real-time imaging screen 85 in the "real-time operation mode" shown in FIG. 16, by pressing the real-time operation mode transition button 446. In the "real-time operation mode", the contents of the reservation sequence are erased, and operations such as zooming, panning, tilting, and rolling of the satellite camera can be directly performed in real time. When the real-time imaging comes to end, the service operation application 42 moves the process on to step S10.

In step S10, the service operation application 42 determines whether to return to the editing operation, or, in other words, whether the editing operation is still in progress. If it is determined in step S10 that the editing operation is still in progress, and there is the need to return to the editing operation, the process moves on to step S3 described above, and the process described above is repeated.

If it is determined in step S10 that the editing operation has ended, and there is no need to return to the editing operation, on the other hand, the service operation application 42 ends the imaging plan creation process.

In the satellite image processing system 1 including the service operation application 42 and the user application 44, the imaging plan creation process is performed as described above. Note that, in the flow of the imaging plan creation process in FIG. 17 described above, real-time imaging is started during editing of the imaging sequence. However, in a case where the predetermined time before the imaging time in the reservation sequence is a time not during the editing of the imaging sequence, the process in steps S7 to S9 described above is performed independently.

By the imaging plan creation process described above, an imaging sequence can be created and edited with the user terminal 43 of the user who is a satellite imaging service user. Also, it is possible to check the satellite camera image being actually captured by the satellite 21 on the basis of the reservation sequence created by the user, or perform imaging by moving the satellite 21 in real time. That is, it is possible to provide an imaging service for imaging with a camera mounted on the satellite 21.

In the example described in the above embodiment, the present technology is applied to an imaging service for imaging with a camera mounted on an artificial satellite 21 that orbits the earth. However, the present technology can also be applied to an artificial satellite that orbits a planet other than the earth, a fixed star, or a satellite. That is, the present technology can be applied to an artificial satellite 21 that orbits a celestial object. For example, the present technology may be applied to an artificial satellite 21 that orbits the moon.

<10. Example of a Computer Configuration>

The series of processes described above can be performed by hardware, or can be performed by software. In a case where the series of processes is performed by the software, a program forming the software is installed into a computer. Here, the computer includes an information processing device, such as a microcomputer incorporated in dedicated hardware, a general-purpose personal computer capable of executing various functions by installing various programs, or a server device, for example.

FIG. 18 is a block diagram illustrating an example of the hardware configuration of a computer that functions as the service providing server 41 in which the service operation application 42 is executed, or the user terminal 43 in which the user application 44 is executed.

In the computer, a central processing unit (CPU) 501, a read only memory (ROM) 502, and a random access memory (RAM) 503 are mutually connected by a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, a touch panel, an input terminal, and the like. The output unit 507 includes a display, a speaker, an output terminal, and the like. The storage unit 508 includes a hard disk, a RAM disk, a nonvolatile memory, and the like. The communication unit 509 includes a network interface or the like. The drive 510 drives a removable recording medium 511 such as a magnetic disk, an optical disk, a magneto-optical disk, or a semiconductor memory.

In the computer designed as described above, for example, the CPU 501 loads a program stored in the storage unit 508 into the RAM 503 via the input/output interface 505 and the bus 504, and executes the program, to perform the series of processes described above. The RAM 503 also stores, as appropriate, data and the like necessary for the CPU 501 to perform various processes.

The programs to be executed by the computer (CPU 501) can be recorded on the removable recording medium 511 as a package medium or the like, and be then provided, for example. Alternatively, the programs can be provided via a wired or wireless transmission medium such as a local area network, the Internet, or digital satellite broadcasting.

In the computer, the removable recording medium 511 is mounted in the drive 510, so that the programs can be installed into the storage unit 508 via the input/output interface 505. Alternatively, the programs can be received by the communication unit 509 via a wired or wireless transmission medium, and be installed into the storage unit 508. Other than the above, the programs can be installed into the ROM 502 or the storage unit 508 in advance.

Note that, a program to be executed by the computer may be a program by which processes are performed in time series in the order described in the present specification, or may be a program by which processes are performed in parallel or a process may be performed at a required time such as when a call is made.

In the present specification, a system means an assembly of a plurality of components (devices, modules (parts), and the like), and it does not matter whether or not all the components are included in the same housing. Therefore, a plurality of devices housed in separate housings and connected via a network, and one device having a plurality of modules included in one housing are both systems.

Embodiments of the present disclosure are not limited to the above embodiments, and various modifications may be made without departing from the scope of the technology of the present disclosure.

For example, a mode in which all or some of the plurality of embodiments described above are combined can be adopted.

For example, the technology according to the present disclosure can provide a configuration of cloud computing in which one function is shared and processed by a plurality of devices cooperating with each other via a network.

Furthermore, each step described in the flowchart described above can be carried out by one device or by a plurality of devices in a shared manner.

Moreover, in a case where a plurality of processes is included in one step, the plurality of the processes included in the one step can be performed by one device or by a plurality of devices in a shared manner.

Note that the effects described in the present specification are merely examples and are not limited thereto, and there may be effects other than those described in the present specification.

Note that the technology of the present disclosure can provide the following configurations.

(1)

An information processing device including a display control unit that causes a first screen to be displayed, the first screen including a map display unit and a time information display unit, the map display unit displaying an artificial satellite that orbits a celestial object and an orbit of the artificial satellite on a map of the celestial object, the time information display unit displaying time information on the orbit of the artificial satellite, in which the display control unit causes the first screen to synchronously display a position of the artificial satellite on the map of the celestial object on the map display unit, and time information about the artificial satellite on the time information display unit.

(2)

The information processing device according to (1), in which the display control unit causes the orbit on the map of the celestial object on the map display unit to further display a time zone in which reservation of imaging by the artificial satellite is not possible.

(3)

The information processing device according to (1) or (2), in which the display control unit causes the map of the celestial object on the map display unit to further display a satellite imaging range indicating a range in which the artificial satellite can perform imaging.

(4)

The information processing device according to any one of (1) to (3), in which the display control unit causes the map of the celestial object on the map display unit to further display a real-time imaging range indicating an area in which the artificial satellite can perform real-time imaging.

(5)

The information processing device according to any one of (1) to (4), in which the display control unit causes the time information on the time information display unit to further display a time zone in which reservation of imaging by the artificial satellite is not possible.

(6)

The information processing device according to any one of (1) to (5), in which the display control unit causes the time information on the time information display unit to further display a real-time imaging enabled time zone indicating a time zone in which the artificial satellite can perform real-time imaging.

(7)

The information processing device according to any one of (1) to (6), in which the display control unit causes the map of the celestial object on the map display unit to further display at least one of an expression of day or night, a cloud forecast, a weather forecast, or a constellation.

(8)

The information processing device according to any one of (1) to (7), in which the display control unit causes a second screen to be displayed, the second screen including a camera image display unit and time information about the artificial satellite on the orbit, the camera image display unit displaying a free viewpoint camera image captured by a free viewpoint camera virtually disposed at a position away from the artificial satellite, or a satellite camera image to be captured by a camera mounted on the artificial satellite.

(9)

The information processing device according to (8), in which the display control unit causes the camera image display unit to seamlessly switch between the free viewpoint camera image and the satellite camera image in accordance with an operation by a user.

(10)

The information processing device according to (8) or (9), in which the display control unit causes the orbit of the artificial satellite on the second screen to display an imaging time frame selected by a user on the first screen.

(11)

The information processing device according to any one of (8) to (10), in which the display control unit causes the free viewpoint camera image or the satellite camera image to display an imaging condition for an imaging time frame selected by a user on the second screen.

(12)

The information processing device according to any one of (1) to (11), in which the display control unit causes a third screen to be displayed, the third screen including a camera image display unit and an imaging preview display unit, the camera image display unit displaying a free viewpoint camera image captured by a free viewpoint camera virtually disposed at a position away from the artificial satellite or a satellite camera image to be captured by a camera mounted on the artificial satellite, the imaging preview display unit displaying the satellite camera image.

(13)

The information processing device according to (12), in which the display control unit causes the third screen to display a first button and a second button, the first button being for copying the satellite camera image on the camera image display unit to the imaging preview display unit, the second button being for making an image on the camera image display unit the same as the satellite camera image on the imaging preview display unit.

(14)

The information processing device according to (12) or (13), in which the display control unit causes the third screen to display an operation button group for performing each camera operation of panning, tilting, rolling, and zooming, a still image capture button for capturing a still image, a moving image capture button for capturing a moving image, and a timeline for chronologically displaying each camera operation designated by a user and imaging timings for a still image and a moving image.

(15)

The information processing device according to any one of (12) to (14), in which the display control unit further has a mode in which each camera operation performed by the user is reflected on the timeline, while the satellite camera image on the imaging preview display unit is reproduced on the third screen.

(16)

The information processing device according to any one of (1) to (15), in which the display control unit causes a fourth screen to be displayed, the fourth screen displaying a satellite image being actually captured by the artificial satellite that is controlled in accordance with an imaging sequence created in advance.

(17)

The information processing device according to (16), in which the display control unit further includes a real-time operation mode transition button on the fourth screen, the real-time operation mode transition button being used by the user operating the artificial satellite to perform imaging in real time.

(18)

The information processing device according to any one of (1) to (17), in which the display control unit cancels control according to an imaging sequence created in advance, and performs control to display a fifth screen on which a user operates the artificial satellite to perform imaging in real time.

(19)

The information processing device according to (18), in which the display control unit further includes a button on the fifth screen, the button being for returning to the control according to the imaging sequence created in advance.

(20)

An information processing method implemented by an information processing device, the information processing method including causing a first screen to be displayed, the first screen including a map display unit and a time information display unit, the map display unit displaying an artificial satellite that orbits a celestial object and an orbit of the artificial satellite on a map of the celestial object, the time information display unit displaying time information on the orbit of the artificial satellite, in which a position of the artificial satellite on the map of the celestial object on the map display unit, and time information about the artificial satellite on the time information display unit are synchronously displayed on the first screen.

REFERENCE SIGNS LIST

| | |
|---|---|
| 1 | Satellite image processing system |
| 11 | Satellite group management device |
| 21 | Artificial satellite (satellite) |
| 41 | Service providing server |
| 42 | Service operation application |
| 43 | Terminal device (user terminal) |
| 44 | User application |
| 51 | Control unit |

-continued

| | |
|---|---|
| 52 | Display unit |
| 53 | Input unit |
| 54 | Communication unit |
| 55 | Storage unit |
| 61 | Control unit |
| 62 | Display unit |
| 63 | Input unit |
| 64 | Communication unit |
| 65 | Storage unit |
| 81 | Area selection screen |
| 82 | Condition search screen |
| 83 | Imaging time frame details selection screen |
| 84 | Imaging sequence editing screen |
| 85 | Real-time imaging screen |
| 101 | Globe display unit |
| 102 | Time slider display unit |
| 111 | Globe |
| 112 | Satellite |
| 113 | Predicted orbit |
| 114 | Unreservable time zone |
| 115 | Satellite imaging range |
| 116 | Real-time imaging range |
| 117 | Search button |
| 118 | 3D globe switching button |
| 119 | Aerial photo switching button |
| 120 | Spot display switching button |
| 121 | Day/night presentation switching button |
| 122 | Cloud forecast switching button |
| 123 | weather forecast switching button |
| 124 | Celestial object switching button |
| 501 | CPU |
| 502 | ROM |
| 503 | RAM |
| 506 | Input unit |
| 507 | Output unit |
| 508 | Storage unit |
| 509 | Communication unit |
| 510 | Drive |

The invention claimed is:

1. An information processing device comprising:

circuitry configured to cause a first screen to be displayed, the first screen including a map display and a time information display, the map display displaying an artificial satellite that orbits a celestial object and an orbit of the artificial satellite on a map of the celestial object, and the time information display displaying time information on the orbit of the artificial satellite, wherein the circuitry causes the first screen to synchronously display a position of the artificial satellite on the map of the celestial object on the map display, and the time information about the artificial satellite on the time information display, and wherein the circuitry is further configured to cause a second screen to be displayed, the second screen including a camera image display and the time information about the artificial satellite on the orbit.

2. The information processing device according to claim 1, wherein the circuitry is further configured to cause the orbit on the map of the celestial object on the map display to further display a time zone in which reservation of imaging by the artificial satellite is not possible.

3. The information processing device according to claim 1, wherein the circuitry is further configured to cause the map of the celestial object on the map display to further display a satellite imaging range indicating a range in which the artificial satellite can perform imaging.

4. The information processing device according to claim 1, wherein the circuitry is further configured to cause the map of the celestial object on the map display to further display a real-time imaging range indicating an area in which the artificial satellite can perform real-time imaging.

5. The information processing device according to claim 1, wherein the circuitry is further configured to cause the time information on the time information display to further display a time zone in which reservation of imaging by the artificial satellite is not possible.

6. The information processing device according to claim 1, wherein the circuitry is further configured to cause the time information on the time information display to further display a real-time imaging enabled time zone indicating a time zone in which the artificial satellite can perform real-time imaging.

7. The information processing device according to claim 1, wherein the circuitry is further configured to cause the map of the celestial object on the map display to further display at least one of an expression of day or night, a cloud forecast, a weather forecast, or a constellation.

8. The information processing device according to claim 1, wherein the camera image display unit displaying displays at least one of a free viewpoint camera image captured by a free viewpoint camera virtually disposed at a position away from the artificial satellite, or a satellite camera image to be captured by a camera mounted on the artificial satellite.

9. The information processing device according to claim 8, wherein the circuitry is further configured to cause the camera image display to seamlessly switch between the free viewpoint camera image and the satellite camera image in accordance with an operation by a user.

10. The information processing device according to claim 8, wherein the circuitry causes the orbit of the artificial satellite on the second screen to display an imaging time frame selected by a user on the first screen.

11. The information processing device according to claim 8, wherein the circuitry is further configured to cause one of the free viewpoint camera image or the satellite camera image to display an imaging condition for an imaging time frame selected by a user on the second screen.

12. The information processing device according to claim 1, wherein the circuitry is further configured to cause a third screen to be displayed, the third screen including a camera image display and an imaging preview display, the camera image display displaying at least one of a free viewpoint camera image captured by a free viewpoint camera virtually disposed at a position away from the artificial satellite, or a satellite camera image to be captured by a camera mounted on the artificial satellite, and the imaging preview display displaying the satellite camera image.

13. The information processing device according to claim 12, wherein the circuitry causes the third screen to display a first button and a second button, the first button being for copying the satellite camera image on the camera image display to the imaging preview display, the second button being for making an image on the camera image display the same as the satellite camera image on the imaging preview display.

14. The information processing device according to claim 12, wherein the circuitry causes the third screen to display an operation button group for performing each camera operation of panning, tilting, rolling, and zooming, a still image capture button for capturing a still image, a moving image capture button for capturing a moving image, and a timeline for chronologically displaying each camera operation designated by a user and imaging timings for a still image and a moving image.

15. The information processing device according to claim 14, wherein the circuitry further has a mode in which each camera operation performed by the user is reflected on the timeline, while the satellite camera image on the imaging preview display is reproduced on the third screen.

16. The information processing device according to claim 1, wherein the circuitry is further configured to cause a fourth screen to be displayed, the fourth screen displays a satellite image being actually captured by the artificial satellite that is controlled in accordance with an imaging sequence created in advance.

17. The information processing device according to claim 16, wherein the circuitry further includes a real-time operation mode transition button on the fourth screen, the real-time operation mode transition button being used by the user operating the artificial satellite to perform imaging in real time.

18. The information processing device according to claim 1, wherein the circuitry is further configured to cancel control according to an imaging sequence created in advance, and causes a fifth screen to be displayed, a user operating the artificial satellite to perform imaging in real time on the fifth screen.

19. The information processing device according to claim 18, wherein the circuitry further includes a button on the fifth screen, the button being for returning to the control according to the imaging sequence created in advance.

20. An information processing method implemented by an information processing device, the information processing method comprising:

causing a first screen to be displayed, the first screen including a map display and a time information display, the map display displaying an artificial satellite that orbits a celestial object and an orbit of the artificial satellite on a map of the celestial object, the time information display displaying time information on the orbit of the artificial satellite, wherein a position of the artificial satellite on the map of the celestial object on the map display, and the time information about the artificial satellite on the time information display are synchronously displayed on the first screen, and wherein the information processing method further comprises causing a second screen to be displayed, the second screen including a camera image display and the time information about the artificial satellite on the orbit.

* * * * *